(12) United States Patent
Watanabe et al.

(10) Patent No.: US 8,420,251 B2
(45) Date of Patent: Apr. 16, 2013

(54) BATTERY AND RELATED METHOD

(75) Inventors: Kyoichi Watanabe, Kanagawa-ken (JP);
Hideaki Horie, Kanagawa-ken (JP);
Takanori Ito, Kanagawa-ken (JP);
Takaaki Abe, Kanagawa-ken (JP);
Osamu Shimamura, Kanagawa-ken (JP); Takamitsu Saitou, Kanagawa-ken (JP); Hiroshi Sugawara, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 444 days.

(21) Appl. No.: 10/358,226

(22) Filed: Feb. 5, 2003

(65) Prior Publication Data
US 2003/0170535 A1 Sep. 11, 2003

(30) Foreign Application Priority Data

Mar. 4, 2002 (JP) .................................. P2002-57945
Jun. 28, 2002 (JP) ............................... P2002-190473
Sep. 13, 2002 (JP) ............................... P2002-267658

(51) Int. Cl.
*H01M 2/24* (2006.01)
*H01M 6/42* (2006.01)
*H01M 2/02* (2006.01)
*H01M 4/82* (2006.01)
*H01M 6/00* (2006.01)

(52) U.S. Cl.
USPC .......... 429/158; 429/149; 429/157; 429/159; 429/178; 429/179; 29/623.1

(58) Field of Classification Search .......... 429/149–163, 429/178, 179; 29/623.1–623.5
See application file for complete search history.

(56) References Cited

U.S. PATENT DOCUMENTS

| | | | | | |
|---|---|---|---|---|---|
| 1,303,919 | A | * | 5/1919 | Lachman | 219/119 |
| 2,379,187 | A | * | 6/1945 | Richards | 219/119 |
| 2,751,428 | A | * | 6/1956 | Depoix | 429/82 |
| 3,586,816 | A | * | 6/1971 | Hagen | 219/121.63 |
| 4,092,464 | A | * | 5/1978 | Dey et al. | 429/127 |
| 5,871,861 | A | | 2/1999 | Hirokou et al. | |

(Continued)

FOREIGN PATENT DOCUMENTS

| | | |
|---|---|---|
| DE | 840713 | 6/1952 |
| EP | 1 059 683 A2 | 12/2000 |

(Continued)

OTHER PUBLICATIONS

European Search Report issued in European Patent Application No. 03002917.7, mailed Jun. 26, 2009.

*Primary Examiner* — Patrick Ryan
*Assistant Examiner* — Julian Anthony
(74) *Attorney, Agent, or Firm* — McDermott Will & Emery LLP

(57) ABSTRACT

A battery is provided with a plurality of unit cells each having a tab, a bus bar connecting the tab of one of the plurality of unit cells and the tab of another one of the plurality of unit cells, and a plurality of welding points disposed on a center of gravity of an area, in which the bus bar and the tab are overlapped, or a vicinity thereof, and at least one position of line segments, radiately extending from the center of gravity, or a vicinity thereof, such that the bus bar and the tab are connected to one another at the plurality of welding points.

24 Claims, 34 Drawing Sheets

U.S. PATENT DOCUMENTS

| | | | |
|---|---|---|---|
| 5,880,424 A * | 3/1999 | Katoh | 219/86.7 |
| 5,972,532 A * | 10/1999 | Oweis et al. | 429/94 |
| 6,087,036 A * | 7/2000 | Rouillard et al. | 429/66 |
| 6,138,898 A * | 10/2000 | Will et al. | 228/157 |
| 6,335,114 B1 * | 1/2002 | Ueshima et al. | 429/94 |

FOREIGN PATENT DOCUMENTS

| | | | |
|---|---|---|---|
| JP | 51-82926 | | 7/1976 |
| JP | 52-51541 | | 4/1977 |
| JP | 60077349 A | * | 5/1985 |
| JP | 62-249353 | | 10/1987 |
| JP | 7-37903 | | 7/1995 |
| JP | 9-330706 | | 12/1997 |
| JP | 2002141051 A | * | 5/2002 |

\* cited by examiner

FIG. 2A
FIG. 2B
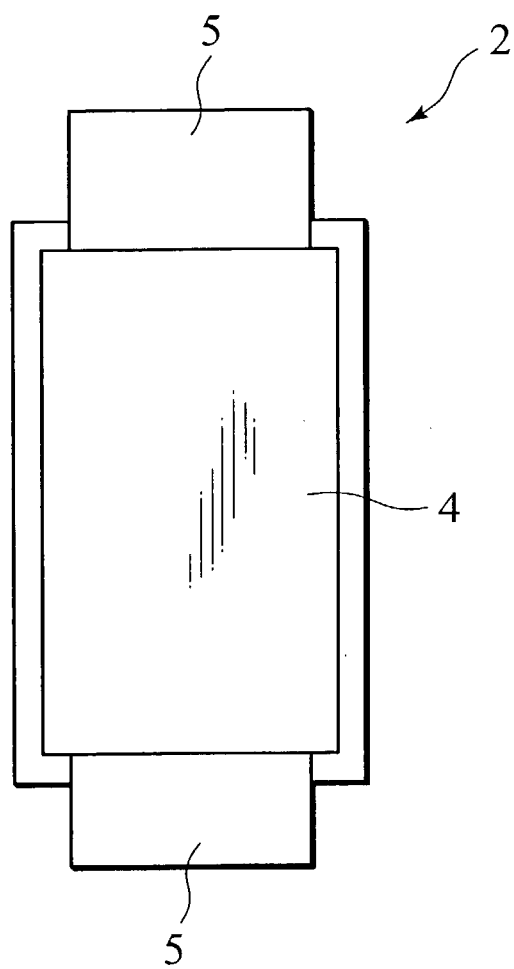
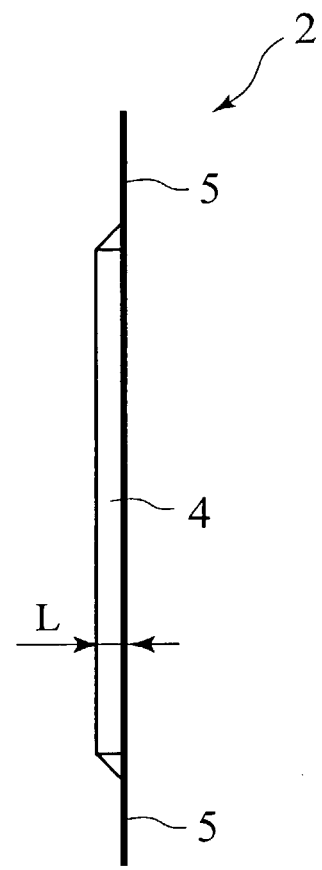

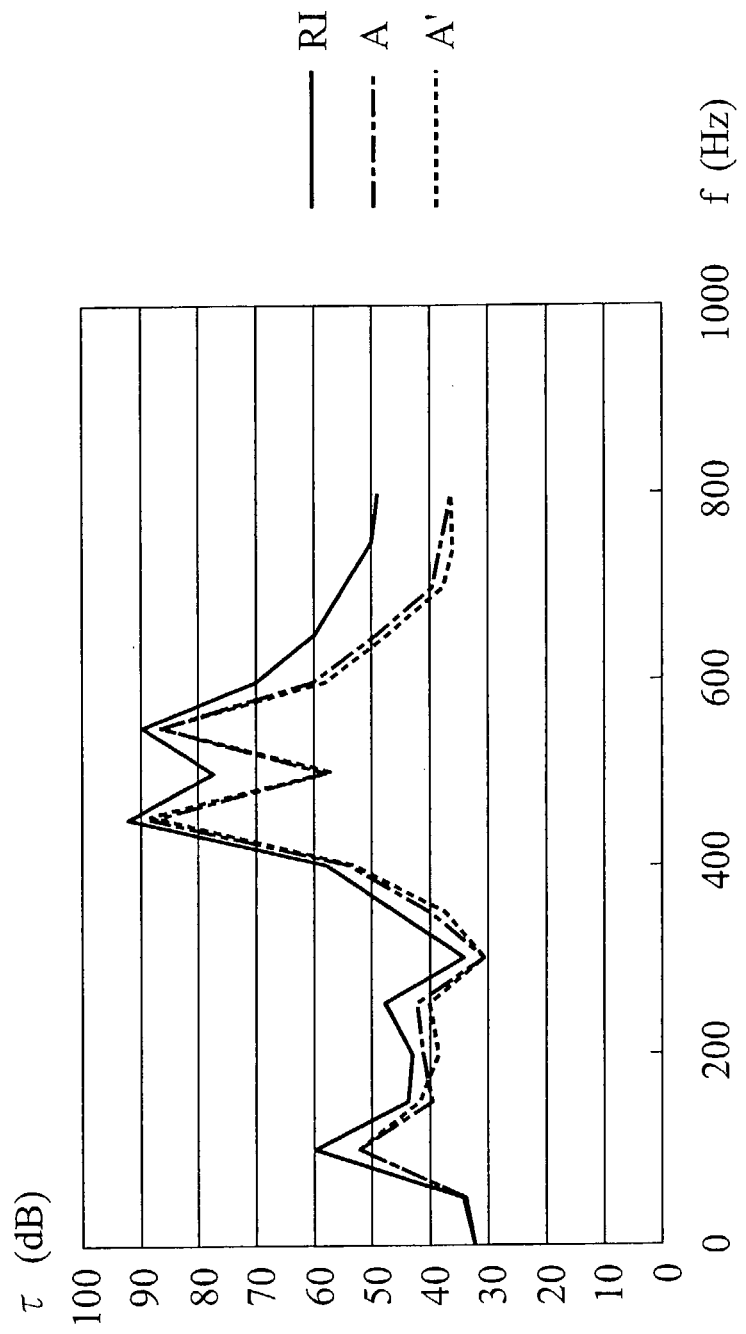

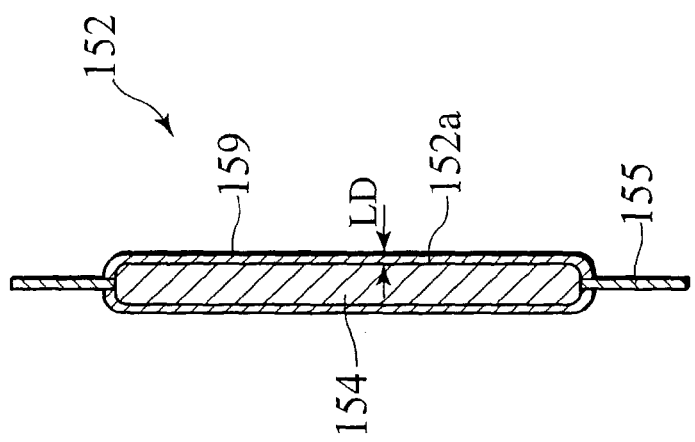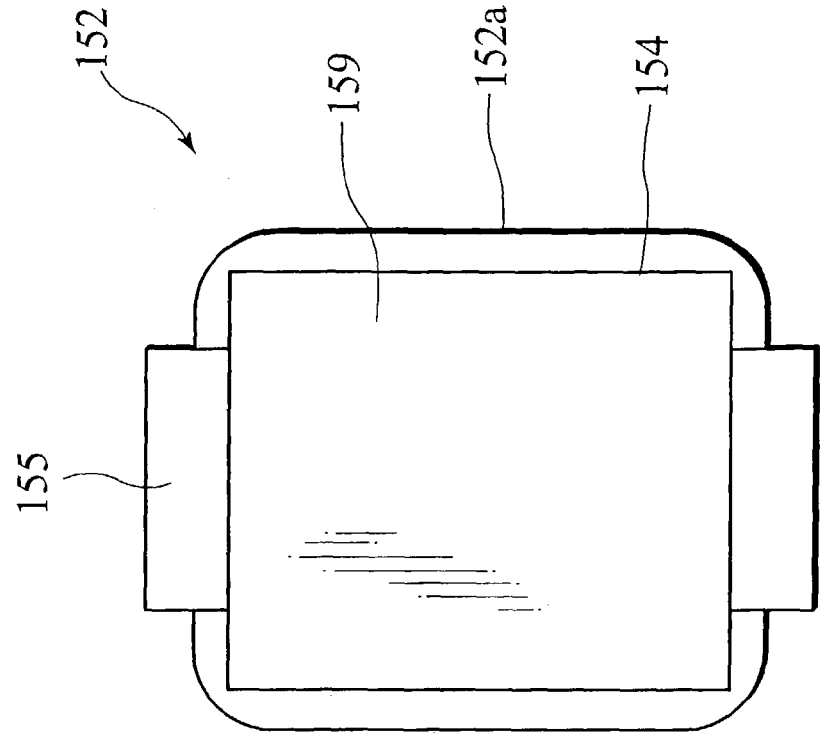

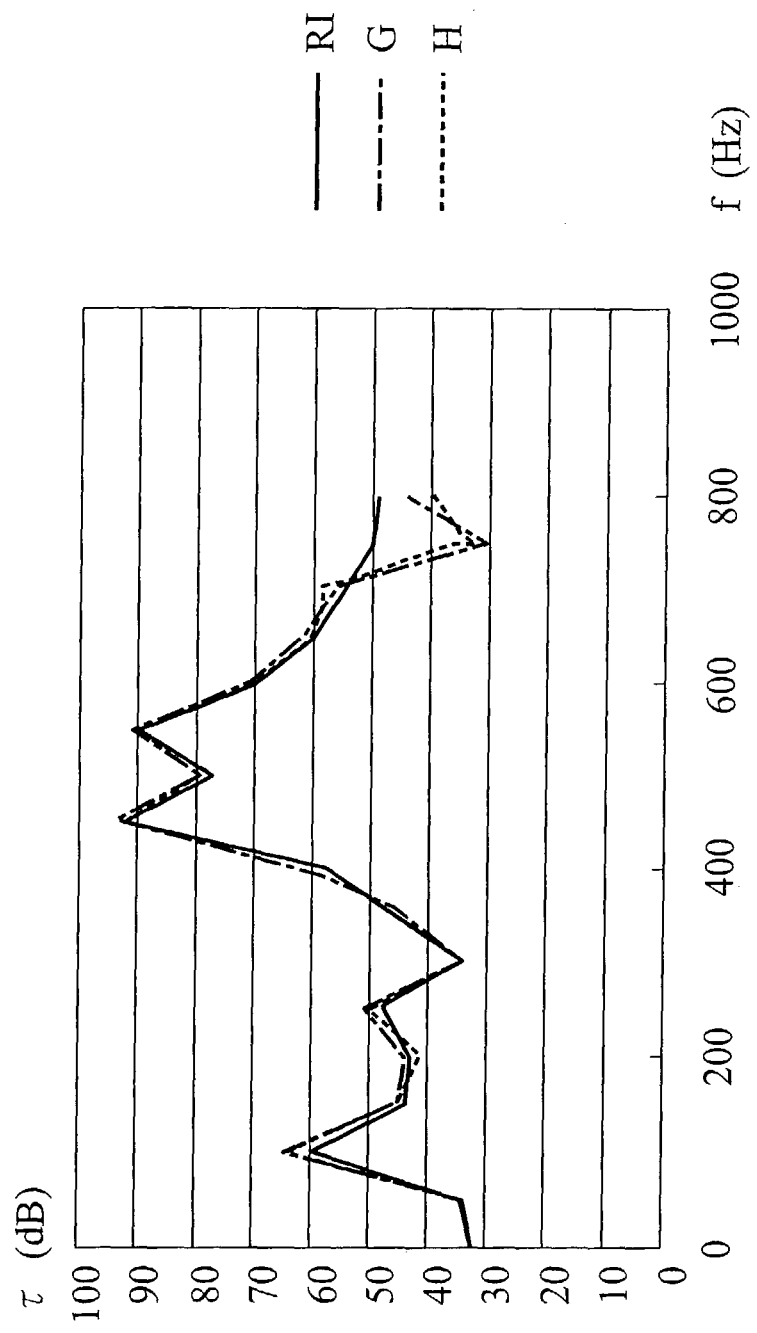

BATTERY AND RELATED METHOD

BACKGROUND OF THE INVENTION

The present invention relates to a battery and a related method and, more particularly, to a battery provided with a plurality of unit cells to be suitably used, for example, as a drive source of an electric vehicle, and its related method.

Recently, there have been a strong demand in the field of assembled battery available to be light in weight and have a large capacity. With such a battery, in order to ensure a desired voltage and capacity, the battery is comprised of a plurality of unit cells which are mutually connected in parallel or in series.

SUMMARY OF THE INVENTION

Considerable studies conducted by the present inventors have revealed that, in the battery, there are come instances where it is hard for the unit cells such as thin type laminate cells, which employ soft cell sheaths such as laminate outer sheaths composed of polymer-metal composite films with low rigidity, i.e., the unit cells each having a cell per se with low rigidity, to adopt a structure wherein a plurality of unit cells are fixed to an outer case and thereafter, tabs connected to electrodes of these unit cells are mutually connected to one another using bus bars.

Namely, when using the battery with such a structure under a circumference wherein the battery is subjected to vibrations, it is hard to eradicate a probability wherein an associated connecting portion tends to get fatigued due to the vibrations to cause an increase in resistance of the battery and an adverse affect on a strength of the battery.

In particular, with the battery, it is conceivable that the internal unit cells tends to shake owing to the vibrations encountered from the outside and, when this occurs, the vibrations are transmitted to the bodies of the unit cells in a mode different from that of the vibrations transmitted to the bus bars and the tabs, with a resultant stress being caused in the connecting portions especially between the bus bars and the tabs to adversely affect the strength of such connecting portions.

It is conceived that such a situation appears in a case where a plurality of unit cells are connected in series with a view to increasing the voltage or in a case where the plurality of unit cells are connected in parallel with a view to increasing the capacity and, it is conceivable that such a situation remarkably appears especially when connecting the unit cells in a mixed state of a series connection and a parallel connection as experienced when using a plurality of unit cells with a low capacity specified for mobile use to structure a battery for a bicycle or a battery for an automobile that require a given voltage with a large capacity.

Further, it is required for the battery with such a structure to be optimized with a view to enhancing an increased efficiency of production.

Furthermore, when forming the unit cell, to provide an increase in the capacity of the battery, with an increase in thickness, for example, when the thin type laminate cell with a thickness of greater than 10 mm is used as the unit cell, heat is apt to accumulate inside the unit cell and, therefore, it is required to find out a structure to maintain a favorable heat dissipating property while ensuring a desired capacity.

Moreover, when trying to use the battery for a long time period, for example, for a unit of ten years, like in a case where the battery is comprised of the unit cells composed of the thin type laminate cells to be installed on the automobile, there is a need for the battery to prevent water from entering the internal part of the battery. More specifically, with a laminate lithium ion battery, since electrolyte includes non-aqueous and the voltage remains in a value as high as 4.2V to 2.5V, if water enters into the battery, electrolysis (with water being decomposed into hydrogen and oxygen at approximately 1.5 V) occurs to produce gas by which a laminate of the outer sheath is expanded to cause a spaced portion to be created between the electrodes. Specifically, if there is an inclusion of both an area in which a distance between the adjacent electrodes is short and an area in which the distance between the adjacent electrodes is far, that is, in an event that the distances between the adjacent electrodes are not uniform, a large current flows through an area wherein the distance between the adjacent electrodes is short, resulting in an increase in temperature to be caught in a vicious cycle where the gas is produced at such an area.

Further, in an event that a high power output is required like in a case where the laminate unit cells are used as the unit cells to provide the battery to be installed in the automobile, each tab must be formed to have an increased thickness. However, if the tab becomes thick, a difficulty is encountered in covering a film around a distal end of the laminate outer sheath and, so, there is a probability of occurrence of a void (hole) between such an outer sheath and the tab, resulting in a probability of causing deterioration in a sealing property. Thus, it is conceived that when trying to use the battery for a prolonged period, i.e., for the unit of ten years, the electrolyte leaks from the void to cause an area, in which the electrode is not damp with the electrolyte, to occur with a resultant decrease in the capacity. Further, if the tab is thick, a large current flows through the tab because of obtaining a high power output to develop heat that is transmitted through the electrodes to the battery body to adversely affect the function of the battery. Additionally, if the tab is thick, in an event that the tab undergoes load such that the tab is bent, a root of the tab encounters a stress to cause an unfavorable result.

Furthermore, when using rivets to connect the bus bar and the tab to one another in the battery, it is conceivable that a flatness of the bus bar and the tab are adversely affected with a resultant increase in unevenness in a contact resistance at the connecting portion. Moreover, owing to the presence of the unevenness in such a contact resistance, unevenness in a heat dissipating property occurs such that heat distribution is internally created in the battery and, additionally, it is hard to say that, in view of simplicity of a structure, the bus bar and the tab are suitably connected to one another.

The present invention has been completed upon such studies set forth above and has an object to provide a battery, which is easy to manufacture and has a high degree of freedom in connection while having an excellent anti-vibration and shock-resistant property, and its related method.

Further, it is another object of the present invention to provide a battery with a high heat resistance and favorable heat dissipating property and its related method.

Furthermore, it is another object of the present invention to provide a battery with a high sealing property and a high waterproof property and its related method.

That is, the present invention has been completed upon, typically in a structure where the tabs of the plurality of unit cells forming the battery are connected through the bus bars, a knowledge in that welding the tab and the bus bar in a given pattern to connect these component parts enables the contact area to be suitably enhanced at such a connecting portion therebetween to provide an improved strength and rigidity while permitting such a contact area to be formed in a uniform manner, whereby a heat transmission property between the tab and the bus bar is improved to provide an increased heat dissipating property while enabling a vibration mode at the connecting portion to be suitably set to reveal a vibration controlling function.

Also, the term "welding" refers to a concept in which the connecting portion, i.e., the connecting portion between the bus bar and the tab is welded and joined to one another using an external energy and which widely includes a usual spot welding, a vibration welding, an ultrasonic welding or the like.

To achieve the above objects, in one aspect of the present invention, a battery comprises: a plurality of unit cells each having a tab; a bus bar connecting the tab of one of the plurality of unit cells and the tab of another one of the plurality of unit cells; and a plurality of welding points disposed on a center of gravity of an area, in which the bus bar and the tab are overlapped, or a vicinity thereof, and at least one position of line segments, radiately extending from the center of gravity, or a vicinity thereof, such that the bus bar and the tab are connected to one another at the plurality of welding points.

In the other words, in another aspect of the present invention, a battery comprises: a plurality of unit cells each having a tab; a bus bar connecting the tab of one of the plurality of unit cells and the tab of another one of the plurality of unit cells; and welding means for welding the bus bar and the tab at a plurality of welding points disposed on a center of gravity of an area, in which the bus bar and the tab are overlapped, or a vicinity thereof, and at least one position of line segments, radiately extending from the center of gravity, or a vicinity thereof, such that the bus bar and the tab are connected to one another at the plurality of welding points.

On the other hand, in another aspect of the present invention, a method of connecting a tab of a battery composed of a plurality of unit cells each having the tab, comprises: preparing a battery including a plurality of unit cells each having a tab; preparing a bus bar; overlapping the bus bar onto the tab of associated one of the plurality of unit cells; and welding the bus bar and the tab at a plurality of welding points disposed on a center of gravity of an area, in which the bus bar and the tab are overlapped, or a vicinity thereof, and at least one position of line segments, radiately extending from the center of gravity, or a vicinity thereof, such that the bus bar and the tab are connected to one another at the plurality of welding points.

Other and further features, advantages, and benefits of the present invention will become more apparent from the following description taken in conjunction with the following drawings.

BRIEF DESCRIPTION OF THE DRAWINGS

FIG. 2A is a plan view of a thin type laminate cell employed as a unit cell in the battery shown in FIG. 1 of the embodiment;

FIG. 2B is a side view of the thin type laminate cell shown in FIG. 2A of the embodiment;

FIG. 5 is a graph mainly representing vibration transmissibility spectrums of the battery of the 1st embodiment and the battery of the 2nd embodiment according to the present invention;

FIG. 31A is a plan view of a thin type laminate cell in a battery of a 26th embodiment according to the present invention;

FIG. 31B is a schematic cross sectional view, taken by an x-z plane in the orthogonal coordinate system representatively shown in FIG. 1, of the thin type laminate cell shown in FIG. 31A of the embodiment;

FIG. 37 is a graph mainly representing vibration transmissibility spectrums of the battery of Comparative Example 1 and the battery of Comparative Example 2.

DETAILED DESCRIPTION OF THE PREFERRED EMBODIMENTS

Figure 1:
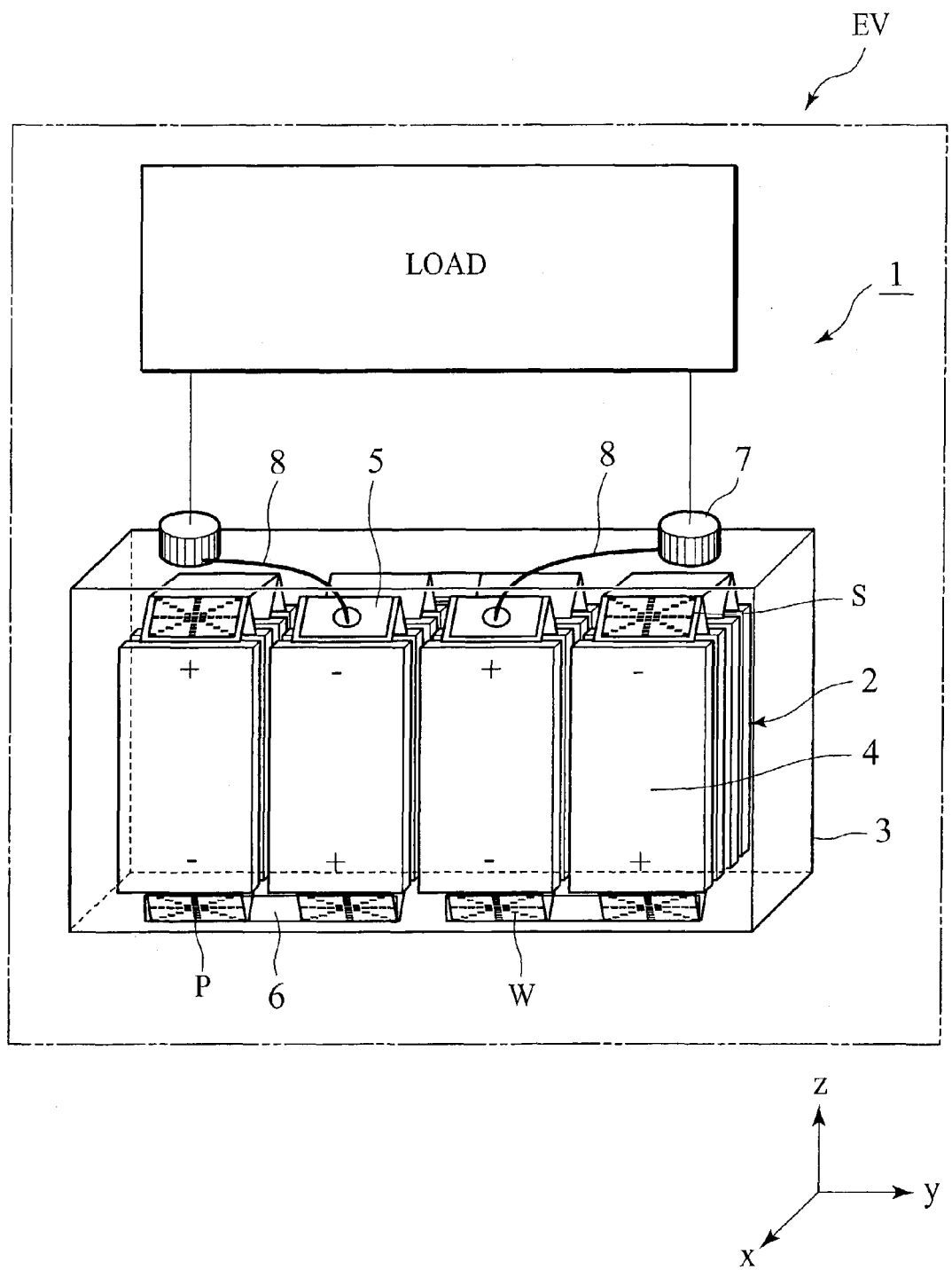
FIG. 1 is an overall perspective view illustrating a battery of a 1st embodiment according to the present invention in a transmissive manner.
Figure 3:
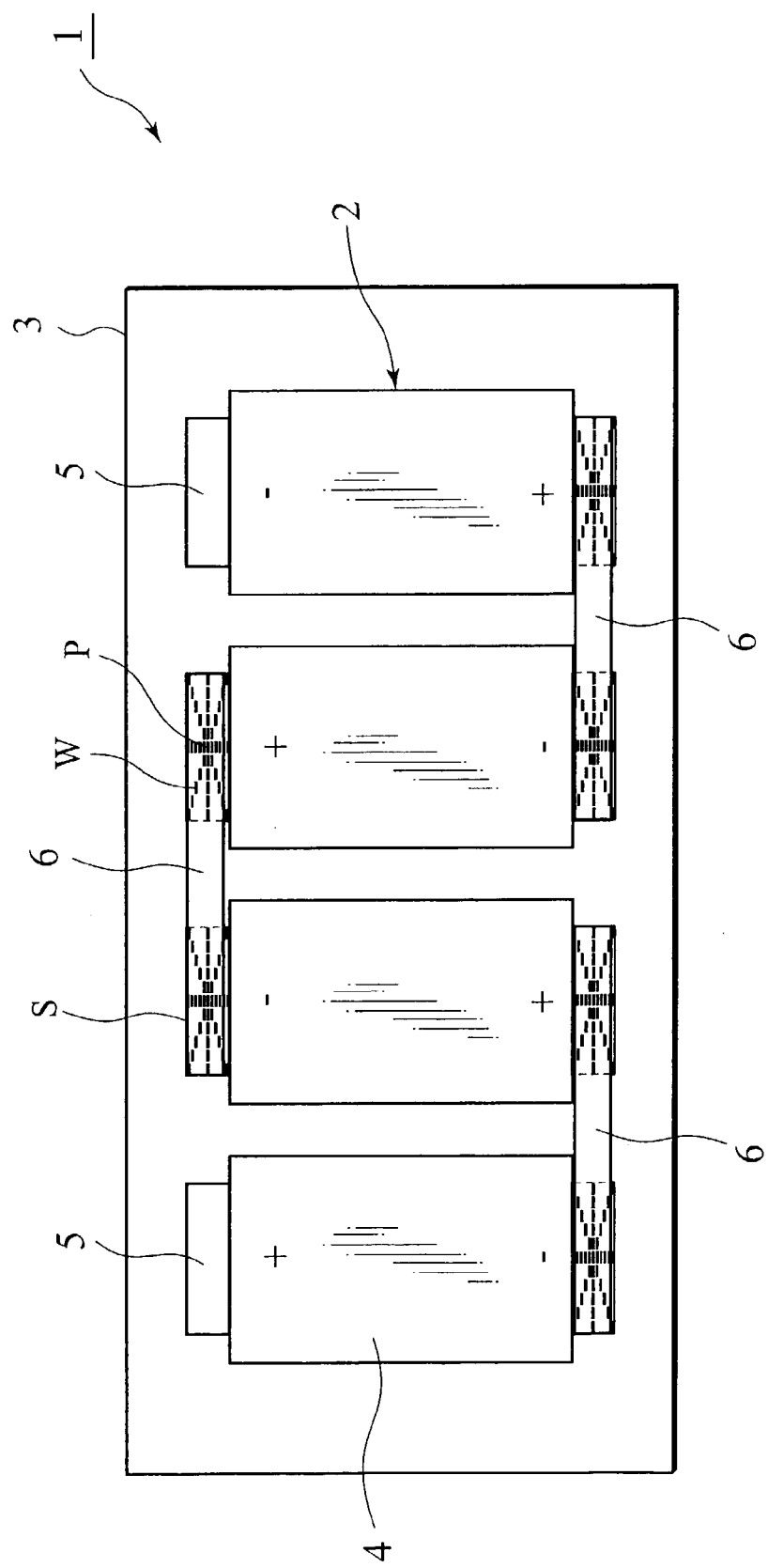
FIG. 3 is a view illustrating an electrically connected state of the thin type laminate cells in the battery of the embodiment.

Reference will now be made in detail to batteries of various embodiments according to the present invention and their related methods which are illustrated in the accompanying drawings. In the following description of the various embodiments and examples, the same reference numerals are referred to the same component parts for convenience's sake of description or to omit a redundant description. Also, x-axis, y-axis and z-axis in the drawings form an orthogonal coordinate system.

(1st Embodiment)

First, a 1st Embodiment of the present invention is described in detail with reference to FIGS. 1 to 4A and FIG. 5.

As shown in FIGS. 1 to 4A, a battery 1 is comprised of unit cells each including a thin type laminate cell 2 having a laminate outer sheath made of polymer-metal composite film that combines polymer, such as nylon, and metal. Within a case 3, two laminate cells 2, connected in parallel in the y-direction, are connected in series in the x-direction in four pieces, and the laminated cells 2 are disposed in parallel in the y-direction while connected in series, thereby forming a so-called 2 parallel-8 series structure.

Figure 21A:
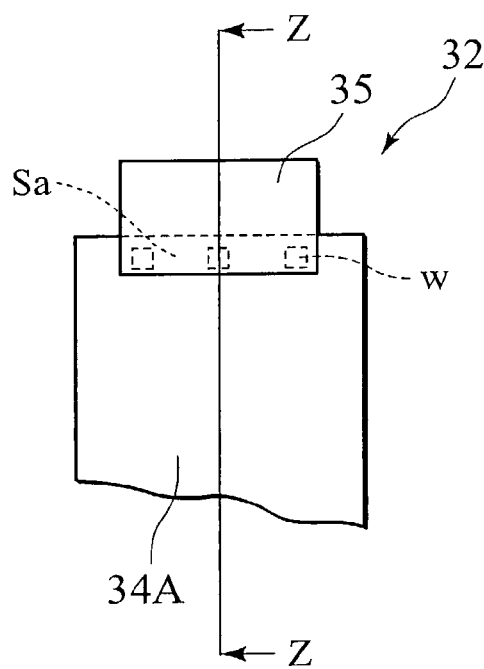
FIG. 21A is a partially enlarged plan view of a thin type laminate cell in a battery of a 16th embodiment according to the present invention.
Figure 21B:
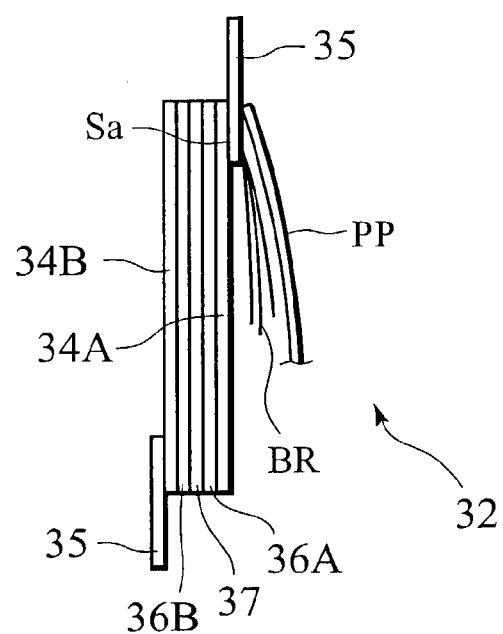
FIG. 21B is a schematic cross sectional view taken along a line Z-Z of FIG. 21A.

More particularly, metallic tabs 5 protruding from cell bodies 4 of the thin type laminate cells 2 are electrically connected to associated electrode plates (of which examples are shown in FIGS. 21A and 21B as schematically described later) at positions internally of the laminate cells 2, and, on the other hand, the tabs of the cell bodies 4 extending outside the laminate cells 2 are electrically connected by means of bus bars 6 to form the 2 parallel-8 series structure. Here, the bus bars 6 and the tabs 5 are connected to one another by welding through the use of an ultrasonic welding machine.

Then, negative terminals and positive terminals of the bus bars 6 are connected to battery terminals 7, 7 via respective lead wires 8, 8. Additionally, the battery terminals 7, 7 are connected to a load of an electric vehicle EV to supply electric power thereto on demand.

Also, if the laminate cell 2 has a thickness L beyond 10 mm, the unit cell is apt to be internally suffered from accumulated heat, and in contrast, if the thickness L is less than 1 mm, then even when formed the positive and negative electrodes in thin films, respectively, it is hard to obtain an adequate capacity with no economic effect being expected. In consideration of increasing heat dissipation while ensuring the desired capacity, after all, it is preferable to use a laminate cell, as a unit cell, with the thickness L laying in a range between 1 mm and 10 mm (equal to or greater than 1 mm and equal to and smaller than 10 mm). Moreover, the tab 5 and the bus bar 6 may be suitably made of aluminum, copper, or iron.

Figure 4A:
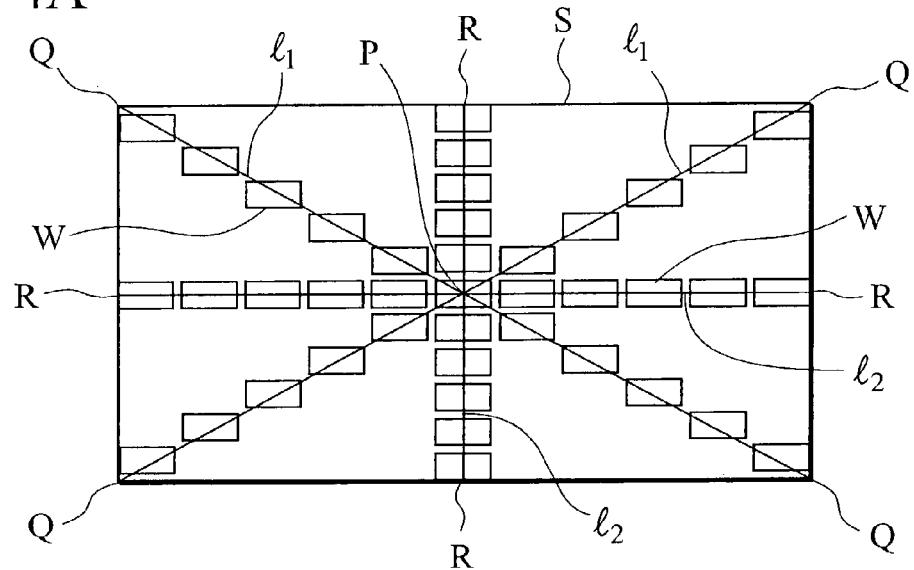
FIG. 4A is a view illustrating a locational pattern of welding points in an overlapped area between a tab of the thin type laminate cell and a bus bar in the battery of the embodiment.

As shown in FIG. 4A in detail, the welding points W in which the bus bar 6 and the tab 5 are connected to one another are disposed on a center P of gravity of an overlapped area S, formed between the bus bar 6 and the tab 5 in a rectangular shaped contour, and on line segments $l_1$, among other line segments radiately extending from the center P of gravity, which extends toward four apexes Q of the rectangular shaped contour. Further, the welding points W are also disposed on line segments $l_2$, among the line segments radiately extending from the center P of gravity, extending toward a center R of four sides of the rectangular shaped contour.

Also, it is to be noted that the center P of gravity, the apexes Q and the center R of the sides have concepts which include respective vicinities. In addition, the contour of the overlapped area S between the bus bar 6 and the tab 5 is not limited to a square shape and may suffice to be formed in polygonal shapes with vertical angles. Also, the shape of the welding point W is not limited to the square shape and may take other configurations such as polygonal shapes or a circle. Moreover, the pattern in which the welding points W are arranged is not limited to a discrete configuration and may take a continuously arranged pattern that forms a line segment in which adjacent welding points W falls in mutual contact with respect to one another. Additionally, any welding technology may be used to cause the bus bar 6 and the tab 5 to reliably melt and joined to one another as at the welding point W and not only the ultrasonic welding technology but also a vibration welding technology or a further general spot welding technology may also be used.

With the structure set forth above, a vibration control operation of the battery of the presently filed embodiment is described below.

First, since the welding points W between the bus bar 6 and the tab 5 are located in the overlapped area S, between the bus bar 6 and the tab 5, where vibration control is to be conducted, that is, at the center P of gravity, of a vibration controlled area where vibration control needs to be carried out to suppress vibrations incident to the overlapped area, and vicinities thereof, vibrations incident to a central area of the vibration controlled area S with the maximum amplitude can be effectively minimized. Additionally, while the welding points W are also located on the line segments radiately extending from such a center P of gravity, the welding points W are not entirely formed in the vibration controlled area S but in a spotted pattern and, thus, the bus bar 6 and the tab 5 are welded together with a lower pressing force and lower welding energy than those required in a particular structure where the entire part of the vibration controlled area S is welded.

In addition, the presence of the welding points W located on diagonal lines extending from the center P of gravity of the vibration controlled area S toward the four apexes Q and on the line segments extending from the center P of gravity toward the center R of the four sides of the vibration controlled area S effectively eliminates vibrations not only in a vibration mode on the diagonal lines of the vibration controlled area S but also in vibration modes in respective directions parallel to the mutually intersecting two sides of the vibration controlled area S.

Here, the vibration mode in each of the directions parallel to the two sides mutually intersecting one another in the vibration controlled area S is described more in detail. In consideration of a situation where the welding points W are disposed on the diagonal line segments extending from the center P of gravity of the vibration controlled area S toward the four apexes Q, supposing that the number of loops of vibration incident along a direction of one of the two sides mutually intersecting one another in the vibration controlled area S is expressed as "m" and the number of loops of vibration incident along another direction of the other one of the two sides is expressed as "n", then the vibration mode is indicated as (m, n). Resultantly, the vibrations of the vibration controlled area S can be effectively minimized especially in the vibration modes (2, 2), (3, 2), (2, 3), (3, 3), (4, 3), (3, 4) and the like.

In addition, further, since the welding points W are also located on the line segments extending from the center P of gravity of the vibration controlled area S toward the center R of the mutually intersecting two sides of the vibration controlled area S, the vibrations not only in the above-described vibration modes but also in the vibration modes (2, 1), (1, 2), (3, 1), (1, 3), (4, 1), (1, 4) and the like can be effectively minimized. Also, it is of course possible to effectively alleviate the vibration in the vibration modes as to the diagonal line segments of the vibration controlled area S.

A test for a vibration transmissibility, which will be described later, of the battery 1 of the presently filed embodiment was conducted, and the vibration transmissibility τ (dB) of vibrations incident to the connected portions made by welding between the bus bar 6 and the tab 5 was measured to obtain a vibration spectrum A, shown in FIG. 5, which will be described below in detail.

(2nd Embodiment)

Figure 4B:
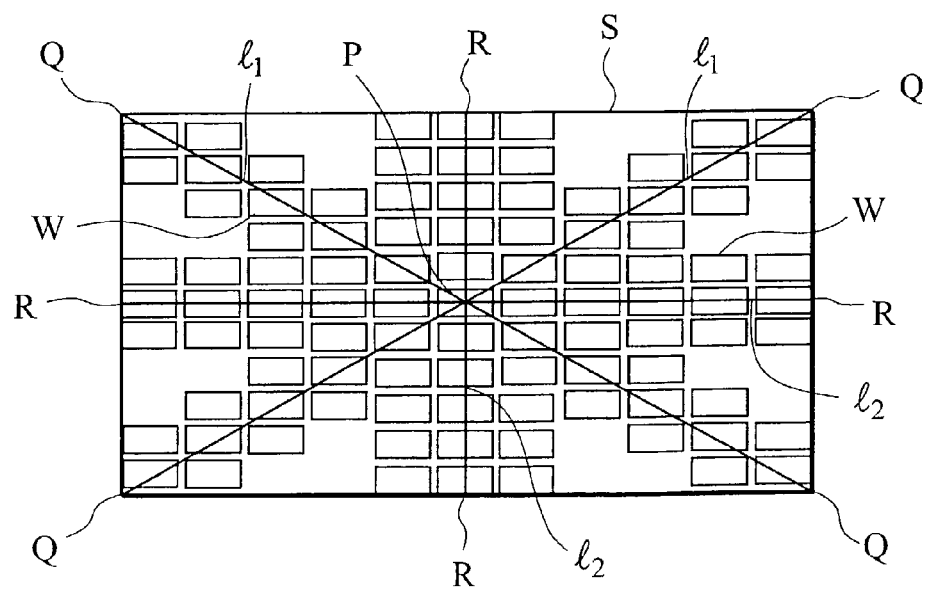
FIG. 4B is a view illustrating a locational pattern with an increased welding points in the overlapped area between a tab of a thin type laminate cell and a bus bar in a battery of a 2nd embodiment according to the present invention.

Now, a 2nd Embodiment of the present invention is described in detail in conjunction with FIGS. 4B and 5.

The battery 1 of the presently filed embodiment fundamentally has the same structure as that of the 1st Embodiment and takes a structure that differs from the 1st Embodiment in that, although the bus bar 6 and the tab 5 are connected to one another with the welding points W formed in the same locational pattern as that of the 1st Embodiment, the number of welding points W are additionally increased to provide an increase in a welding surface area.

With the structure of the presently filed embodiment, since the welding points W between the bus bar 6 and the tab 5 are located in the overlapped area S, between the bus bar 6 and the tab 5, where vibration control needs to be carried out, i.e., at the center P of gravity of the vibration controlled area S, which needs the vibration control, and the vicinities thereof, the vibration incident to the central area of the vibration controlled area S with the maximum amplitude can be effectively minimized.

Additionally, since the welding points W are located on the diagonal line segments $l_1$, extending from the center P of gravity of the vibration controlled area S toward the four apexes Q of the vibration controlled area S, and the line segments $l_2$ extending from the center P of gravity of the vibration controlled area S toward the center R of the four sides of the vibration controlled area S, the vibrations not only in the vibration modes on the diagonal line segments of the vibration controlled area S but also the vibrations in the vibration modes on the respective directions parallel to the mutually intersecting two sides of the vibration controlled area S can be effectively minimized.

A test for the vibration transmissibility, which will be described later, of the battery 1 of the presently filed embodiment was conducted, and the vibration transmissibility τ (dB) of vibrations incident to the connected portions made by welding between the bus bar 6 and the tab 5 was measured to obtain a vibration spectrum A', shown in FIG. 5, which will be described below in detail.

(3rd Embodiment)

A 3rd Embodiment of the present invention is described below in detail with reference to FIGS. 6A and 7.

Figure 6A:
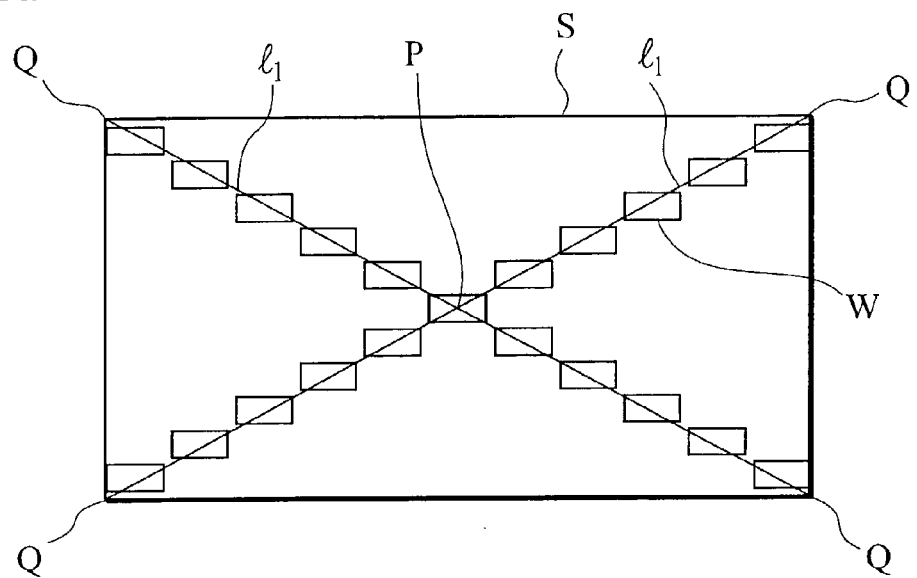
FIG. 6A is a view illustrating a locational pattern of welding points in an overlapped area between a tab of a thin type laminate cell and a bus bar in a battery of a 3rd embodiment according to the present invention.
Figure 7:
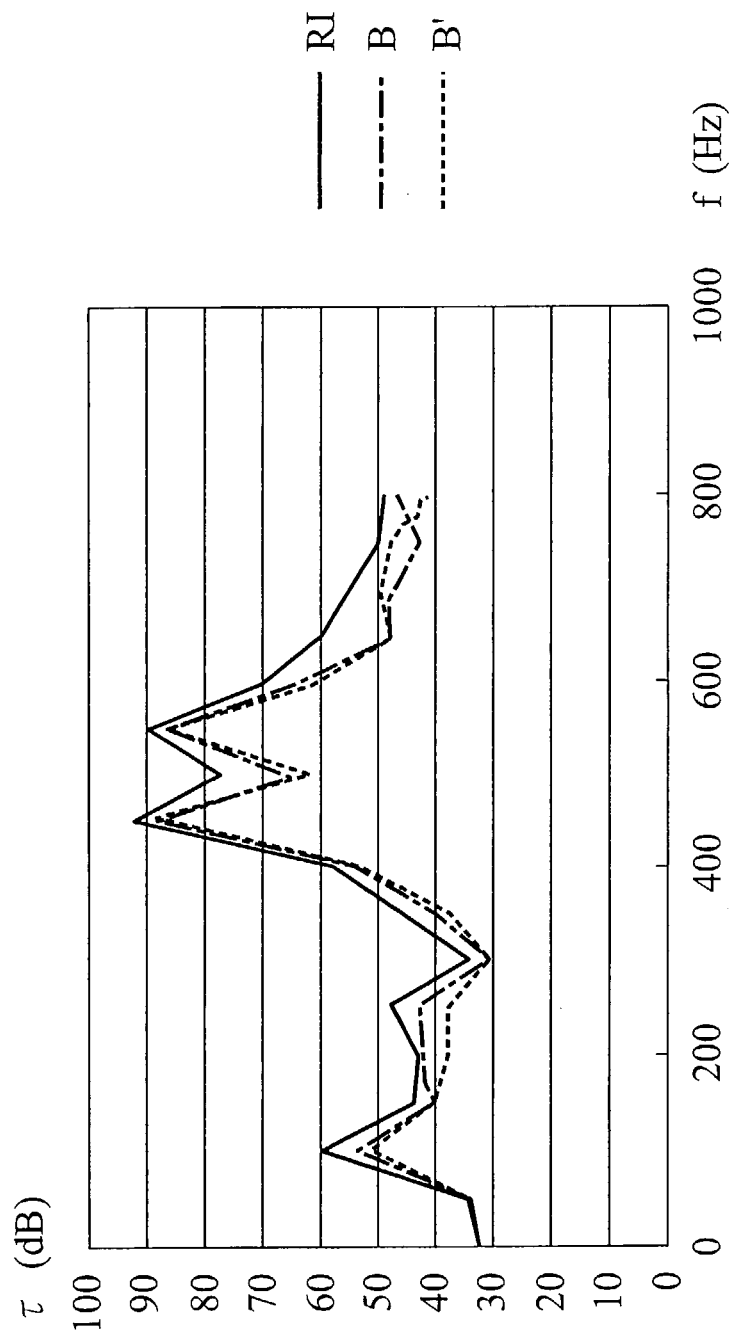
FIG. 7 is a graph mainly representing vibration transmissibility spectrums of the battery of the 3rd embodiment and the battery of the 4th embodiment according to the present invention.

The battery 1 of the presently filed embodiment fundamentally has the same structure as that of the 1st Embodiment but differs from the 1st Embodiment, as shown in FIG. 6A, in that the bus bar 6 and the tab 5 are connected to one another via welding points W formed in a locational pattern different from that of the 1st Embodiment. Namely, the welding points W are provided at the center P of gravity of the overlapped area S, between both component parts, which is formed in the rectangular shape contour, and only the line segments $l_1$ among the line segments radiately extending from the center P of gravity of the area S, extending from the center P of gravity toward the four apexes Q of the rectangular shape contour.

With the structure of the presently filed embodiment, also, since the welding points W between the bus bar 6 and the tab 5 are located in the overlapped area S, between the bus bar 6 and the tab 5, which needs vibration control, i.e., at the center P of gravity of the vibration controlled area S, that needs vibration control, and the vicinities thereof, vibration incident to the central area of the vibration controlled area S with the maximum amplitude can be effectively minimized.

Additionally, since the welding points W are disposed on the diagonal line segments $l_1$ extending from the center P of gravity of the vibration controlled area S toward the four apexes Q, the vibrations in the vibration modes on the diagonal line segments of the vibration controlled area S and the vibrations in the vibration modes on the respective directions parallel to the mutually intersecting two sides of the vibration controlled area S can be effectively minimized.

Here, the vibration mode in each of the directions parallel to the two sides mutually intersecting one another in the vibration controlled area S is described more in detail. In consideration of a situation where the welding points W are disposed on the diagonal line segments $l_1$ extending from the center P of gravity of the vibration controlled area S toward the four apexes Q, supposing that the number of loops of vibration along a direction of one of the two sides mutually intersecting one another in the vibration controlled area S is expressed as "m" and the number of loops of vibration along another direction of the other one of the two sides is expressed as "n", then the vibration mode is indicated as (m, n). Resultantly, the vibrations of the vibration controlled area S can be effectively eliminated in the vibration modes (2, 2), (3, 2), (2, 3), (3, 3), (4, 3), (3, 4) and the like.

A test for vibration transmissibility, which will be described later, of the battery 1 of the presently filed embodiment and the vibration transmissibility τ (dB) at the connected portions made by welding between the bus bar 6 and the tab 5 was measured to obtain a vibration spectrum B, shown in FIG. 7, which will be described below in detail.

(4th Embodiment)

A 4th Embodiment of the present invention is described below in detail with reference to FIGS. 6B and 7.

Figure 6B:
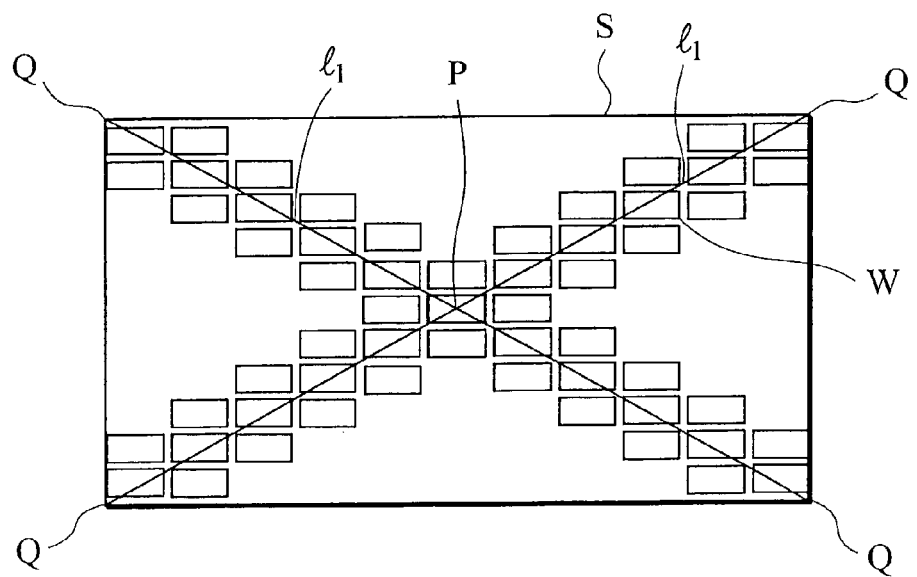
FIG. 6B is a view illustrating a locational pattern with an increased welding points in an overlapped area between a tab of a thin type laminate cell and a bus bar in a battery of a 4th embodiment according to the present invention.

The battery 1 of the presently filed embodiment fundamentally has the same structure as that of the 3rd Embodiment but differs from the 3rd Embodiment, as shown in FIG. 6B, in that, although the bus bar 6 and the tab 5 are connected to one another with the welding points W formed in the same locational pattern as that of the 3rd Embodiment, the bus bar 6 and the tab 5 are connected to one another via welding points W formed in another locational pattern with an increase in the number of welding points and an increase in the welded surface area.

With the structure of the presently filed embodiment, also, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibrations at the central area of the vibration controlled area S with the maximum amplitude.

Additionally, since the welding points W are located on the diagonal line segments $l_1$ extending from the center P of gravity of the vibration controlled area S toward the four apexes Q, vibrations in the vibration modes on the diagonal line segments of the vibration controlled area S and vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility τ (dB) at the connected portions made by welding between the bus bar 6 and the tab 5 was measured to obtain a vibration spectrum B' shown in FIG. 7 which will be described below in detail.

(5th Embodiment)

A 5th Embodiment of the present invention is described below in detail with reference to FIGS. 8A and 9.

Figure 8A:
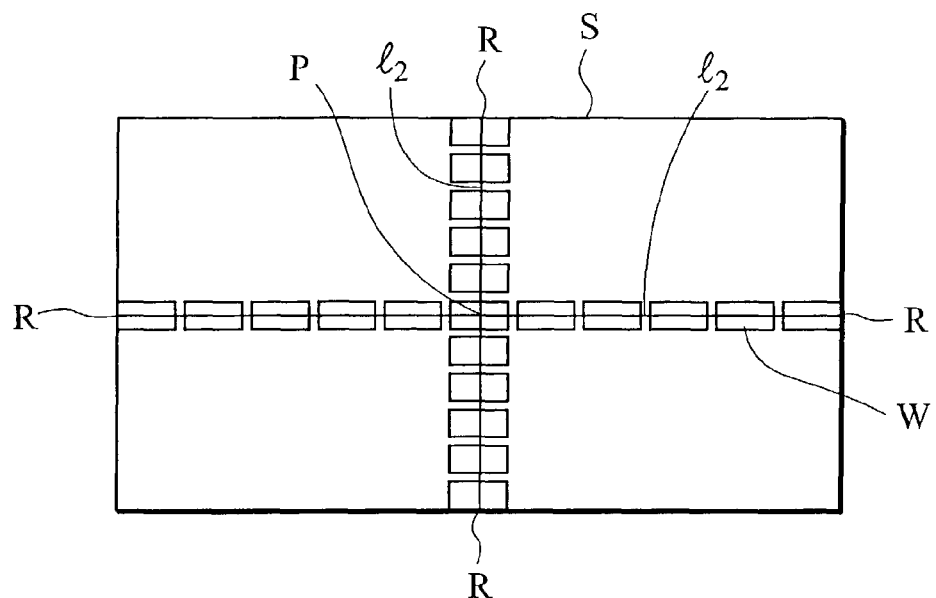
FIG. 8A is a view illustrating a locational pattern of welding points in an overlapped area between a tab of a thin type laminate cell and a bus bar in a battery of a 5th embodiment according to the present invention.
Figure 9:
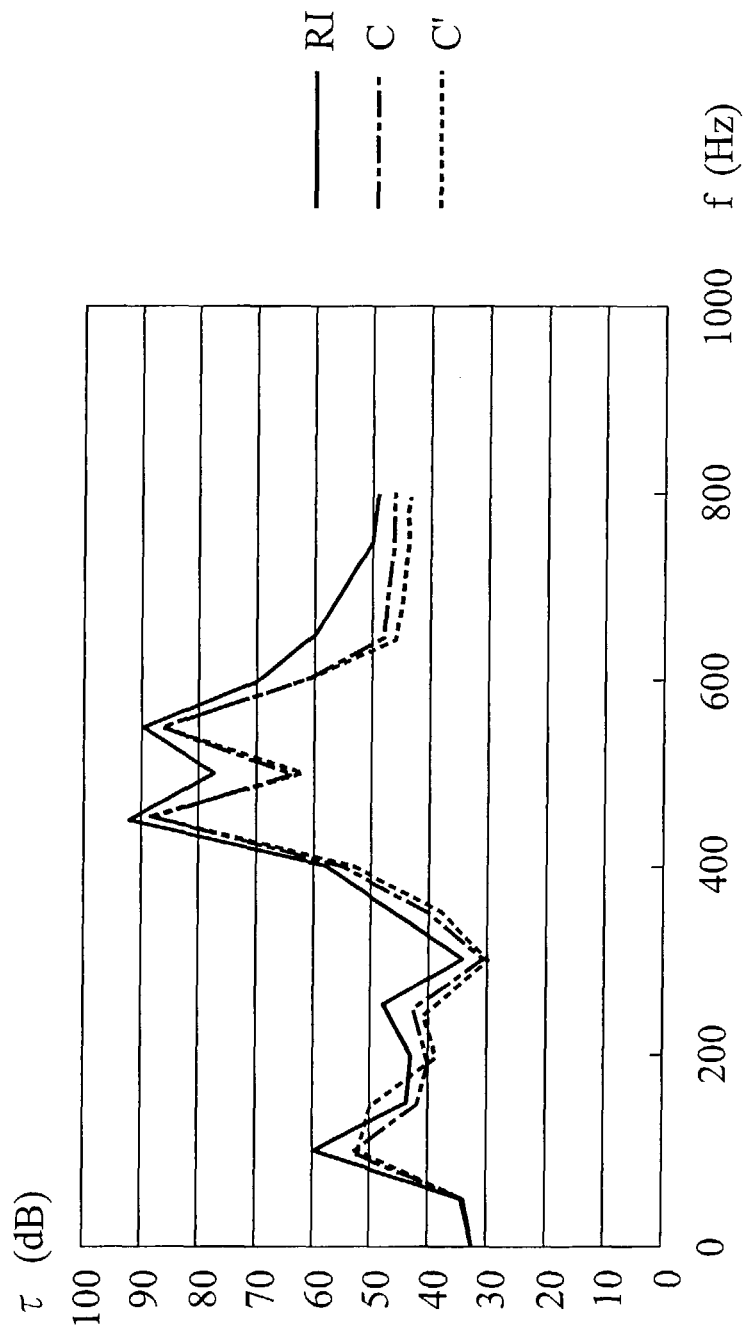
FIG. 9 is a graph representing vibration transmissibility spectrums of the battery of the 5th embodiment and the battery of the 6th embodiment according to the present invention.

The battery 1 of the presently filed embodiment fundamentally has the same structure as that of the 1st Embodiment but differs from the 1st embodiment, as shown in FIG. 8A, in that the bus bar 6 and the tab 5 are connected to one another via welding points W formed in another locational pattern. In particular, the welding points W for connecting the bus bar 6 and the tab 5 to one another are located on the center P of gravity of the overlapped area S formed between the bus bar 6 and the tab 5 in the rectangular shape contour, and only the line segments $l_2$, among the line segments radiately extending from the center P of gravity, extending toward the center R of the four sides of the rectangular shape contour.

With the structure of the presently filed embodiment, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibration incident to the central area of the vibration controlled area S with the maximum amplitude.

Additionally, since the welding points W are disposed on the line segments 12 extending from the center P of gravity of the vibration controlled area S toward the center R of the four sides, the vibrations in the vibration modes on the diagonal line segments of the vibration controlled area S and the vibrations in the vibration modes on the respective directions parallel to the mutually intersecting two sides of the vibration controlled area S can be effectively minimized.

Here, the vibration mode in each of the directions parallel to the two sides mutually intersecting one another in the vibration controlled area S is described more in detail. In consideration of a situation where the welding points W are located on the line segments $l_2$ extending from the center P of gravity of the vibration controlled area S toward the center R of the mutually intersecting two sides of the vibration controlled area S, supposing that the number of loops of vibration along a direction of one of the two sides mutually intersecting one another in the vibration controlled area S is expressed as "m" and the number of loops of vibration in another direction of the other one of the two sides is expressed as "n", then the vibration mode is indicated as (m, n). Resultantly, the vibrations of the vibration controlled area S can be effectively eliminated in the vibration modes (2, 1), (1, 2), (3, 1), (1, 3), (4, 1), (1, 4) and the like.

A test for the vibration transmissibility, which will be described later, of the battery 1 of the presently filed embodiment was conducted, and the vibration transmissibility τ (dB) at the connected portions made by welding between the bus bar 6 and the tab 5 was measured to obtain a vibration spectrum C, shown in FIG. 9, which will be described below in detail.

(6th Embodiment)

A 6th Embodiment of the present invention is described below in detail with reference to FIGS. 8B and 9.

Figure 8B:
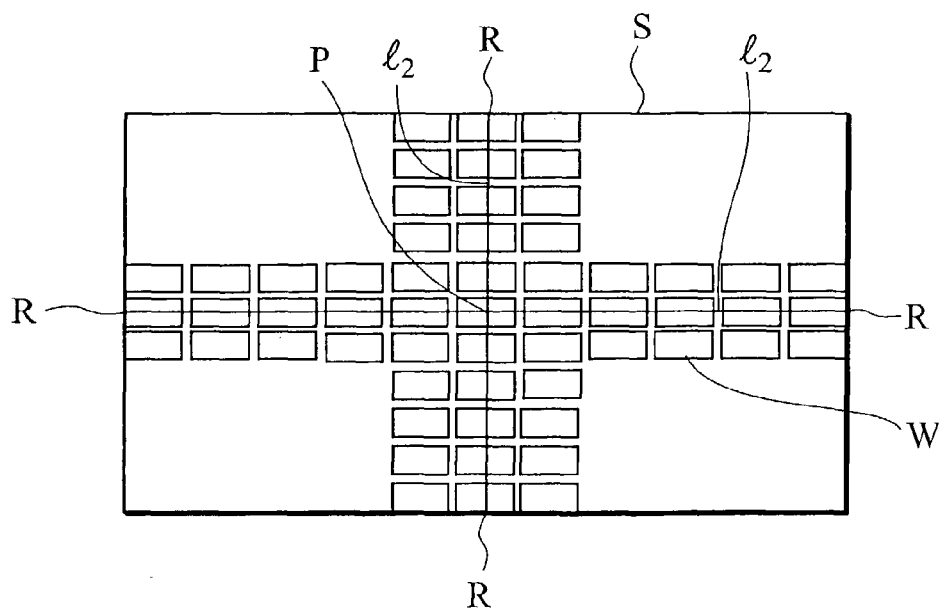
FIG. 8B is a view illustrating a locational pattern with an increased welding points in an overlapped area between a tab of a thin type laminate cell and a bus bar in a battery of a 6th embodiment according to the present invention.

The battery 1 of the presently filed embodiment fundamentally has the same structure as that of the 5th Embodiment but differs from the 5th Embodiment, as shown in FIG. 8B, in that, although the bus bar 6 and the tab 5 are connected to one another with the welding points W formed in the same locational pattern as that of the 5th Embodiment, the bus bar 6 and the tab 5 are connected to one another via welding points W formed in another locational pattern with additional increase in the number of welding points W and an increase in the welded surface area.

With the structure of the presently filed embodiment, also, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibration at the central area of the vibration controlled area S with the maximum amplitude.

Additionally, since the welding points W are disposed on the line segments $l_2$ extending from the center P of gravity of the vibration controlled area S toward the center R of the two sides, of the vibration controlled area S, which intersects one another, the vibrations in vibration modes on the diagonal line segments of the vibration controlled area S and vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility τ (dB) at the connected portions made by welding between the bus bar 6 and the tab 5 was measured to obtain a vibration spectrum C', shown in FIG. 9, which will be described below in detail.

(7th Embodiment)

A 7th Embodiment of the present invention is described below in detail with reference to FIGS. 10A and 11.

Figure 10A:
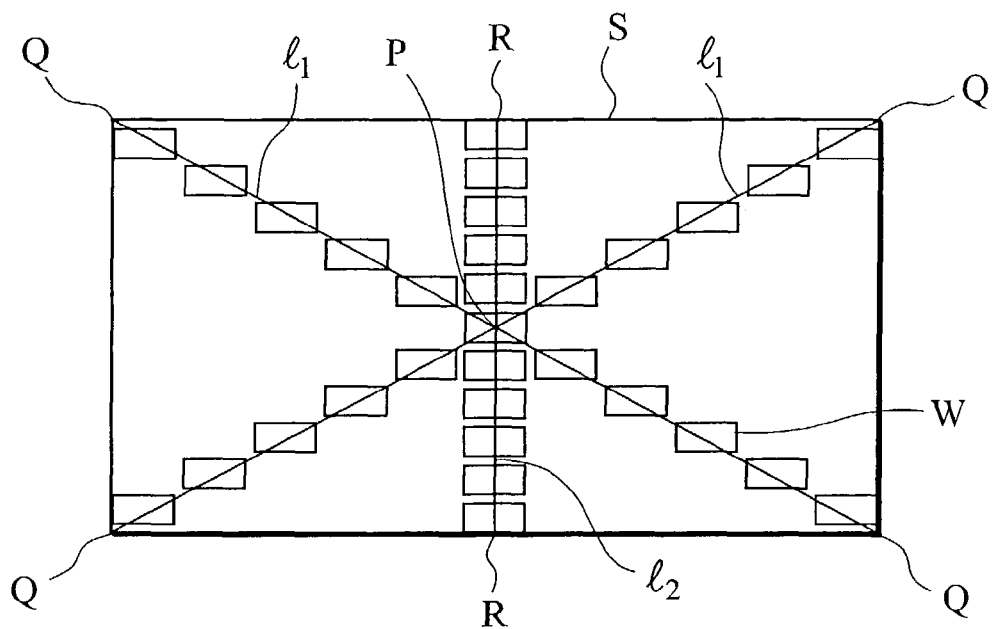
FIG. 10A is a view illustrating a locational pattern of welding points in an overlapped area between a tab of a thin type laminate cell and a bus bar in a battery of a 7th embodiment according to the present invention.
Figure 11:
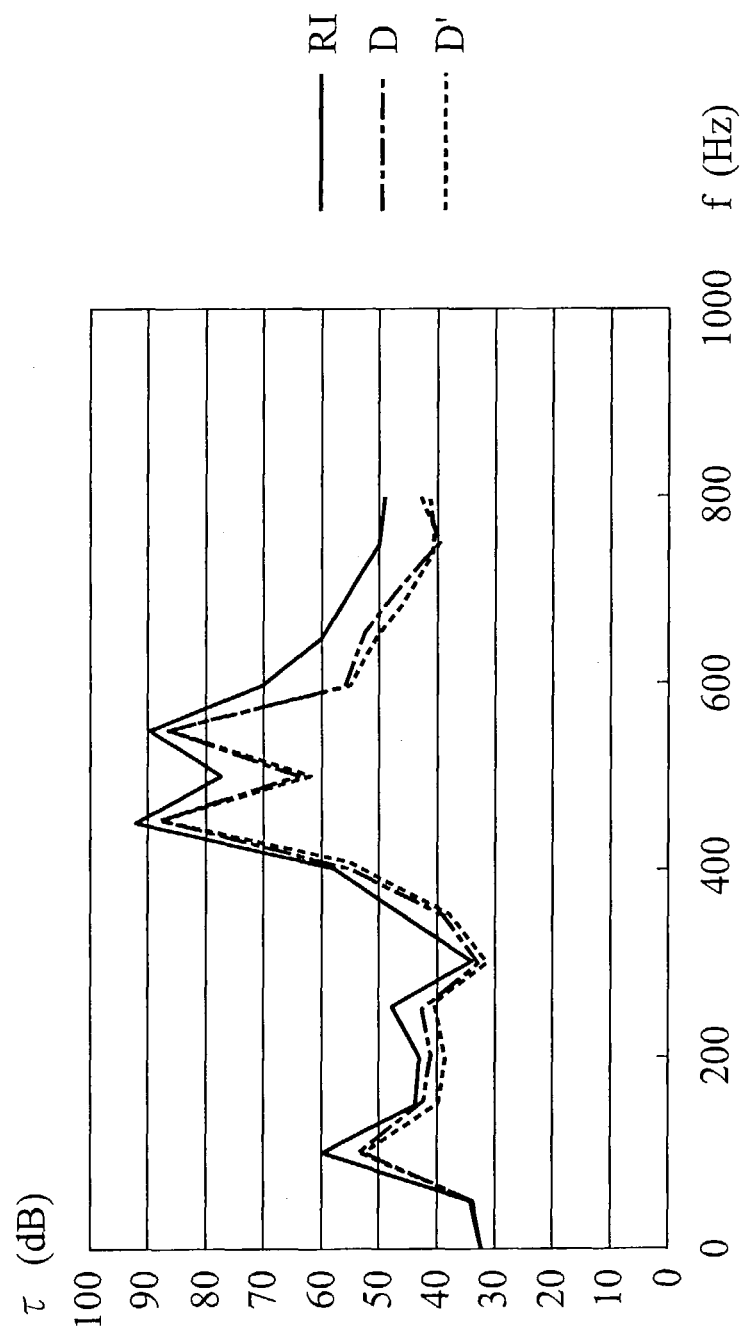
FIG. 11 is a graph mainly representing vibration transmissibility spectrums of the battery of the 7th embodiment and the battery of the 8th embodiment according to the present invention.

The battery 1 of the presently filed embodiment fundamentally has the same structure as that of the 3rd Embodiment but differs from the 3rd Embodiment, as shown in FIG. 10A, in that the bus bar 6 and the tab 5 are connected to one another via welding points W provided on the center P of gravity of the overlapped area S formed between the bus bar 6 and the tab 5 in the rectangular shape contour, and the line segments $l_1$, among the line segments radiately extending from the center P of gravity of the overlapped area S, extending from the center P of gravity toward the four apexes Q of the rectangular shape contour whereupon, in addition, the welding points W are also located on the line segments $l_2$ extending from the center P of gravity to the center R of the mutually opposing two sides (upper and lower sides shown in FIG. 10A) of the rectangular shape contour.

With the structure of the presently filed embodiment, also, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibration at the central area of the vibration controlled area S with the maximum amplitude.

Additionally, since the welding points W are located on the diagonal line segments $l_1$ extending from the center P of gravity of the vibration controlled area S toward the four apexes Q of the vibration controlled area S and on the line segments $l_2$ extending from the center P of gravity of the vibration controlled area S toward the center R of the two sides of the vibration controlled area S, vibrations not only in the vibration modes on the diagonal line segments of the vibration controlled area S but also vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility τ (dB) at the connected portions made by welding between the bus bar 6 and the tab 5 was measured to obtain a vibration spectrum D, shown in FIG. 11, which will be described below in detail.

(8th Embodiment)

An 8th Embodiment of the present invention is described below in detail with reference to FIGS. 10B and 11.

Figure 10B:
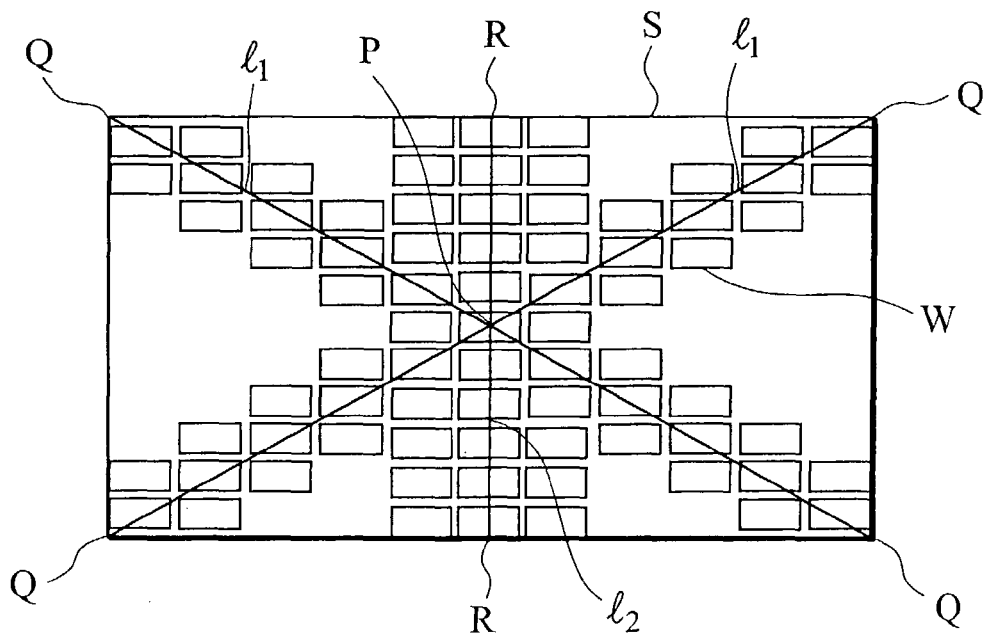
FIG. 10B is a view illustrating a locational pattern with an increased welding points in an overlapped area between a tab of a thin type laminate cell and a bus bar in a battery of an 8th embodiment according to the present invention.

The battery 1 of the presently filed embodiment fundamentally has the same structure as that of the 7th Embodiment but differs from the 7th Embodiment, as shown in FIG. 10B, in that, although the bus bar 6 and the tab 5 are connected to one another with the welding points W formed in the same locational pattern as that of the 7th Embodiment, the bus bar 6 and the tab 5 are connected to one another via welding points W formed in another locational pattern with additional increase in the number of welding points W and an increase in the welded surface area.

With the structure of the presently filed embodiment, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibration at the central area of the vibration controlled area S with the maximum amplitude.

Additionally, since the welding points W are located on the diagonal line segments $l_1$, extending from the center P of gravity of the vibration controlled area S toward the four apexes Q and on the line segments $l_2$ extending toward the center R of the two sides, vibrations not only in the vibration modes on the diagonal line segments of the vibration controlled area S but also vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility τ (dB) at the connected portions made by welding between the bus bar 6 and the tab 5 was measured to obtain a vibration spectrum D', shown in FIG. 11, which will be described below in detail.

(9th Embodiment)

A 9th Embodiment of the present invention is described below in detail with reference to FIGS. 12A and 13.

Figure 12A:
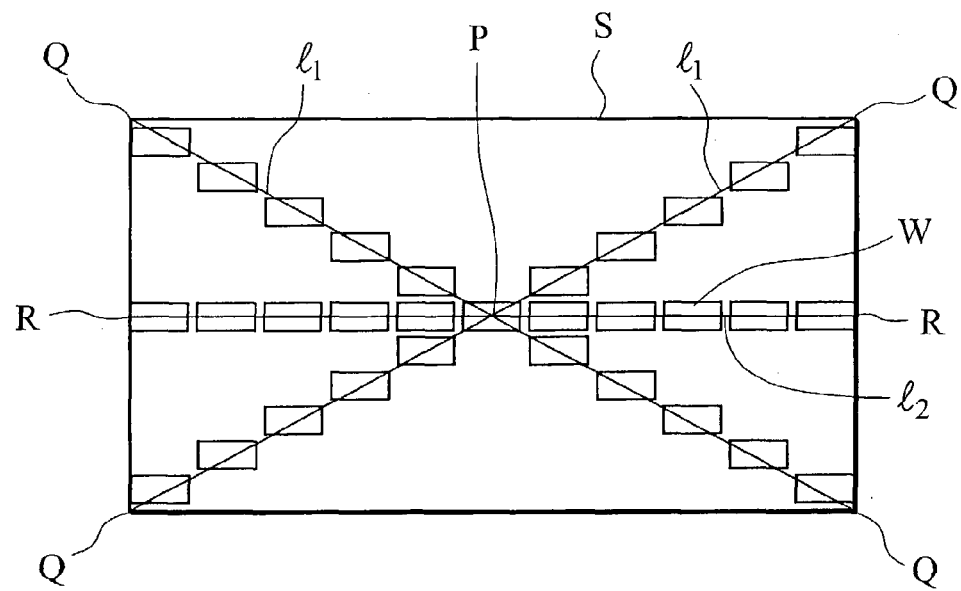
FIG. 12A is a view illustrating a locational pattern of welding points in an overlapped area between a tab of a thin type laminate cell and a bus bar in a battery of a 9th embodiment according to the present invention.
Figure 13:
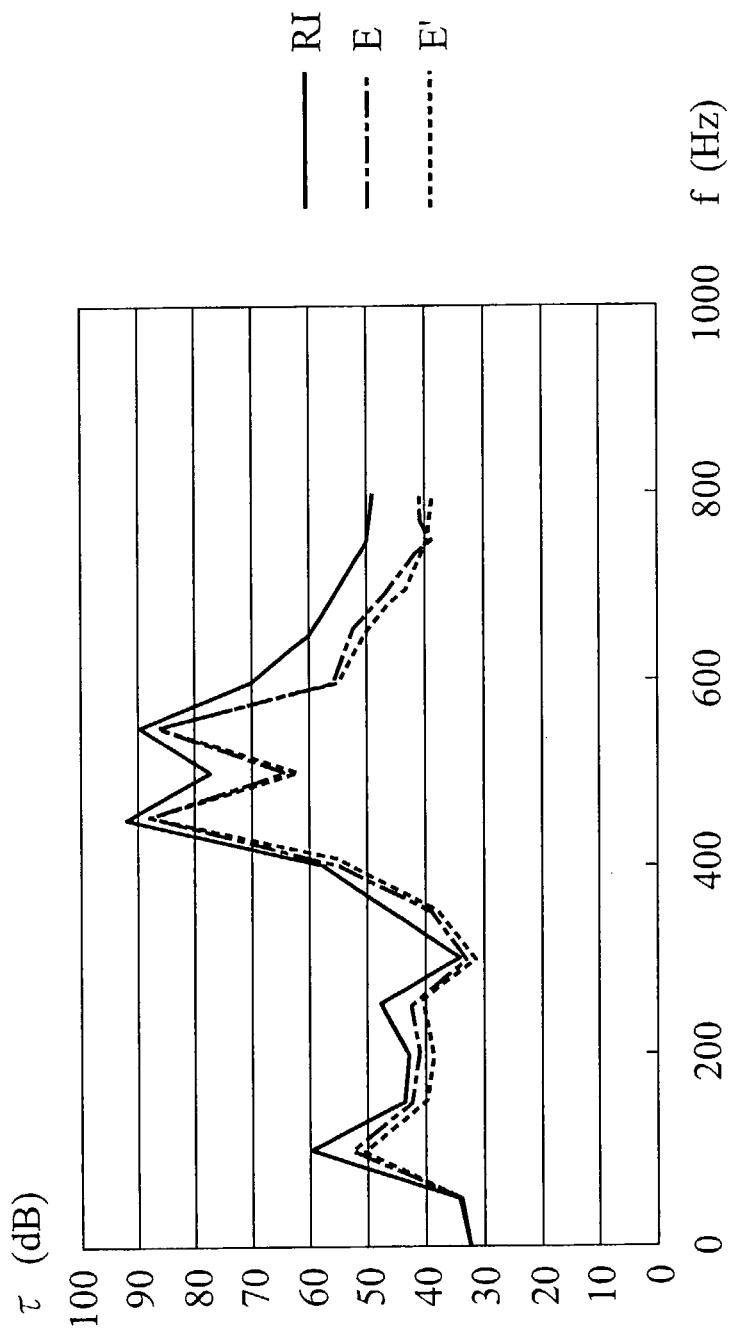
FIG. 13 is a graph mainly representing vibration transmissibility spectrums of the battery of the 9th embodiment and the battery of the 10th embodiment according to the present invention.

The battery 1 of the presently filed embodiment fundamentally has the same structure as that of the 3rd Embodiment but differs from the 3rd Embodiment, as shown in FIG. 12A, in that the bus bar 6 and the tab 5 are connected to one another via welding points W provided on the center P of gravity of the overlapped area S formed between the bus bar 6 and the tab 5 in the rectangular shape contour, and the line segments $l_1$, among the line segments radiately extending from the center P of gravity, extending from the center P of gravity to the four apexes Q of the rectangular shape contour whereupon, in addition, the welding points W are also located on the line segments l2 extending from the center P of gravity to the center R of the mutually opposing two sides (upper and lower sides shown in FIG. 12A) of the rectangular shape contour.

With the structure of the presently filed embodiment, since the welding points W between the bus bar 6 and the tab 5 are located in the overlapped area S, between the bus bar 6 and the tab 5, which needs vibration control, i.e., at the center P of gravity of the vibration controlled S, which needs vibration control, and the vicinities thereof, it is possible to effectively eliminate vibration at the central area of vibration controlled area S with the maximum amplitude.

Additionally, since the welding points W are located on the diagonal line segments $l_1$, extending from the center P of gravity of the vibration controlled area S toward the four apexes Q, and the line segments $l_2$ extending toward the center R of the two sides, vibrations not only in the vibration modes on the diagonal line segments of the vibration controlled area S but also vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility $\tau$ (dB) at the connected portions made by welding between the bus bar 6 and the tab 5 was measured to obtain a vibration spectrum E, shown in FIG. 13, which will be described below in detail.

(10th Embodiment)

A 10th Embodiment of the present invention is described below in detail with reference to FIGS. 12B and 13.

Figure 12B:
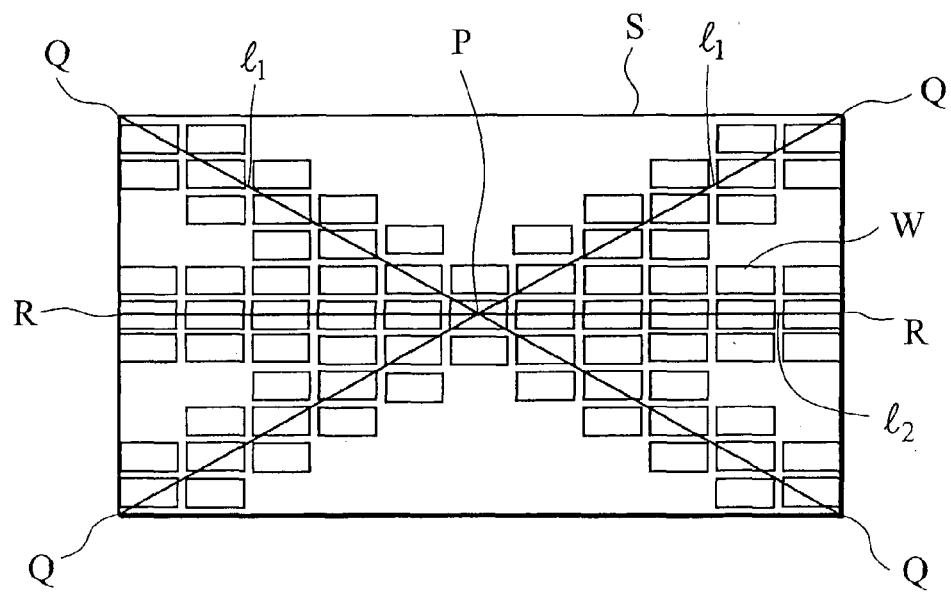
FIG. 12B is a view illustrating a locational pattern with an increased welding points in an overlapped area between a tab of a thin type laminate cell and a bus bar in a battery of a 10th embodiment according to the present invention.

The battery 1 of the presently filed embodiment fundamentally has the same structure as that of the 9th Embodiment but differs from the 9th Embodiment, as shown in FIG. 12B, in that, although the bus bar 6 and the tab 5 are connected to one another with the welding points W formed in the same locational pattern as that of the 9th Embodiment, the bus bar 6 and the tab 5 are connected to one another via welding points W formed in another locational pattern with additional increase in the number of welding points W and an increase in the welded surface area.

With the structure of the presently filed embodiment, also, since the welding points W between the bus bar 6 and the tab 5 are located in the overlapped area S, between the bus bar 6 and the tab 5, which needs vibration control, i.e., at the center P of gravity of the vibration controlled area S, which needs vibration control, and the vicinities thereof, it is possible to effectively eliminate vibration at the central area of the vibration controlled area S with the maximum amplitude.

Additionally, since the welding points W are located on the diagonal line segments $l_1$, extending from the center P of gravity of the vibration controlled area S toward the four apexes Q, and the line segments $l_2$ extending toward the center R of the two sides, vibrations not only in the vibration modes on the diagonal line segments of the vibration controlled area S but also vibrations in the vibration modes on the respective directions parallel to the mutually intersecting two sides of the vibration controlled area S can be effectively eliminated.

A test for the vibration transmissibility, which will be described later, of the battery 1 of the presently filed embodiment was conducted, and the vibration transmissibility $\tau$ (dB) at the connected portions made by welding between the bus bar 6 and the tab 5 was measured to obtain a vibration spectrum E', shown in FIG. 13, which will be described below in detail.

(11th Embodiment)

An 11th Embodiment of the present invention is described below in detail with reference to FIGS. 14A and 15.

Figure 14A:
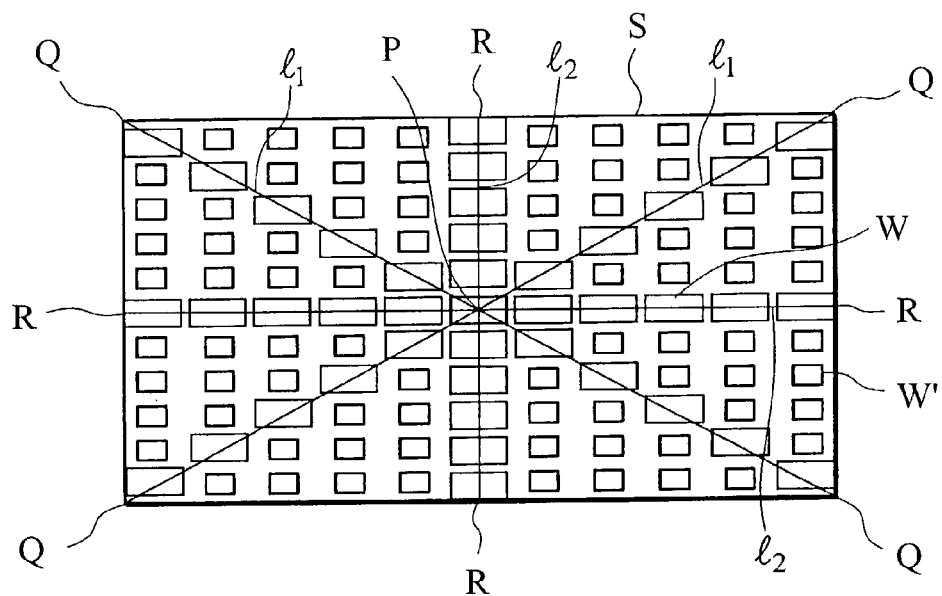
FIG. 14A is a view illustrating a locational pattern of welding points in an overlapped area between a tab of a thin type laminate cell and a bus bar in a battery of an 11th embodiment according to the present invention.
Figure 15:
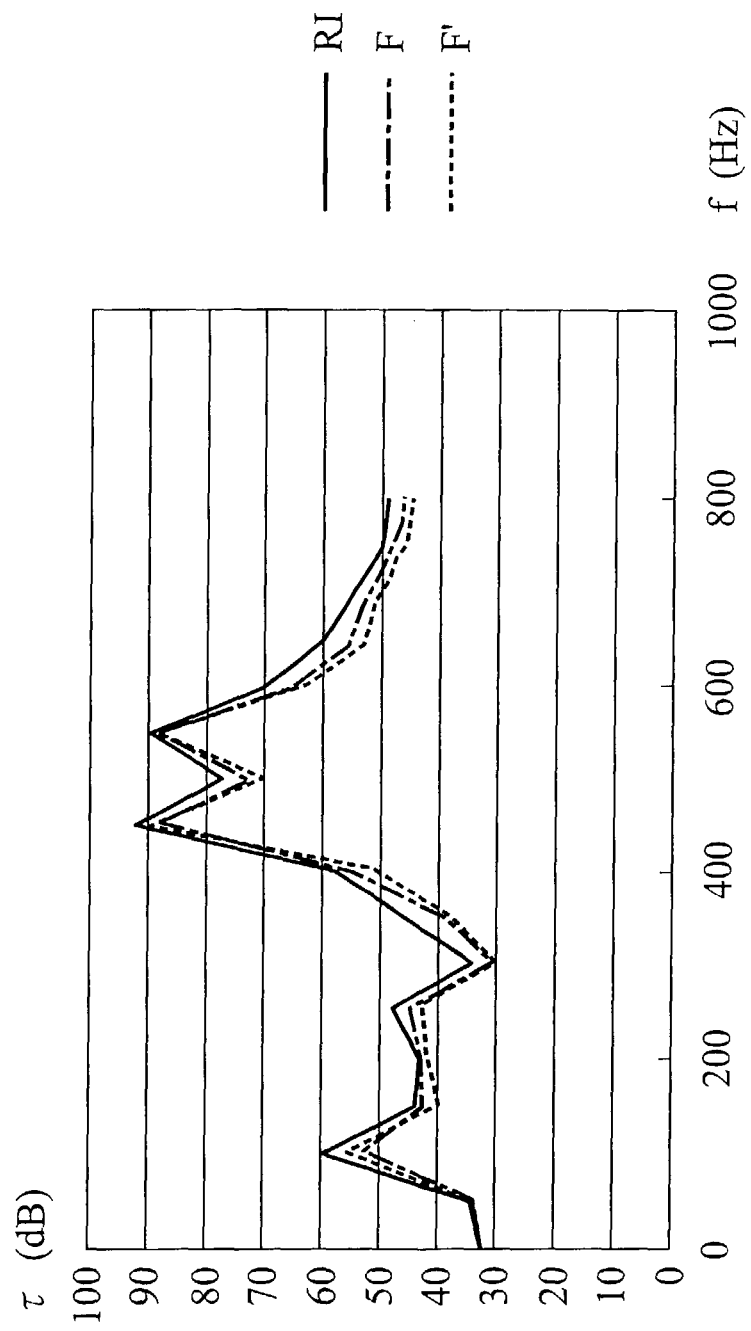
FIG. 15 is a graph mainly representing vibration transmissibility spectrums of the battery of the 11th embodiment and the battery of the 12th embodiment according to the present invention.

The battery 1 of the presently filed embodiment fundamentally has the same structure as that of the 1st Embodiment but differs from the 1st Embodiment, as shown in FIG. 14A, in that, while the bus bar 6 and the tab 5 are connected to one another with the welding points W formed in the same locational pattern as that of the 1st Embodiment, welding points W' are additionally located in blank areas, with no presence of the welding points, in lattice forms in the overlapped area S between the bus bar 6 and the tab 5, thereby providing an increase in the welded surface area. Also, though each of the additional welding points W' is arranged to have a surface area reduced about by half of that of each original welding point W, such an surface area of each additional welding point W' may be substantially the same as that of each original welding point W.

With the structure of the presently filed embodiment, since the overlapped area S, between the bus bar 6 and the tab 5, which needs vibration control, i.e., a substantially entire area of the vibration controlled area S, are welded, vibration at such a vibration controlled area S can be effectively eliminated.

A test for the vibration transmissibility, which will be described later, of the battery 1 of the presently filed embodiment was conducted, and the vibration transmissibility $\tau$ (dB) at the connected portions made by welding between the bus bar 6 and the tab 5 was measured to obtain a vibration spectrum F, shown in FIG. 15, which will be described below in detail.

(12th Embodiment)

A 12th Embodiment of the present invention is described below in detail with reference to FIGS. 14B and 15.

Figure 14B:
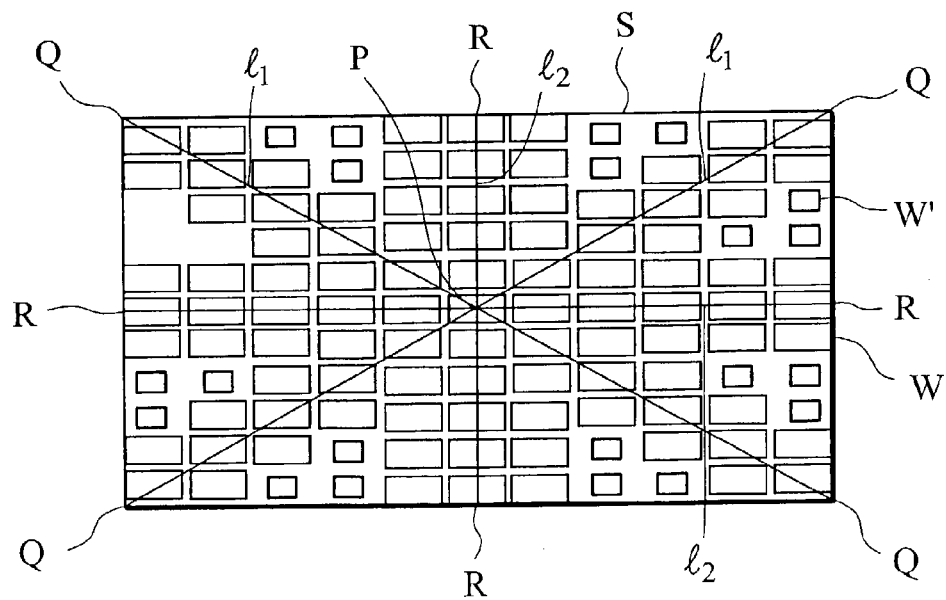
FIG. 14B is a view illustrating a locational pattern with an increased welding points in an overlapped area between a tab of a thin type laminate cell and a bus bar in a battery of a 12th embodiment according to the present invention.

The battery 1 of the presently filed embodiment fundamentally has the same structure as that of the 2nd Embodiment but differs from the 2nd Embodiment, as shown in FIG. 14B, in that, while the bus bar 6 and the tab 5 are connected to one another with the welding points W formed in the same locational pattern as that of the 2nd Embodiment, welding points W' are additionally disposed in blank areas, with no presence of the welding points W, in lattice forms in the overlapped area S between the bus bar 6 and the tab 5, thereby providing an increase in the welded surface area. Also, though each of the additional welding points W' is arranged to have a surface area reduced about by half of that of each original welding point W like in the 11th Embodiment, such an surface area of each additional welding point W' may be substantially the same as that of each original welding point W, too.

With the structure of the presently filed embodiment, since the overlapped area S, between the bus bar 6 and the tab 5, which needs vibration control, i.e., a substantially entire area of the vibration controlled area S, are welded, vibration at such a vibration controlled area S can be effectively eliminated.

A test for the vibration transmissibility, which will be described later, of the battery 1 of the presently filed embodiment was conducted, and the vibration transmissibility $\tau$ (dB)

at the connected portions made by welding between the bus bar 6 and the tab 5 was measured to obtain a vibration spectrum F', shown in FIG. 15, which will be described below in detail.

(13th Embodiment)

Next, a 13th Embodiment of the present invention is described in detail with reference to FIGS. 16 and 5.

Figure 16:
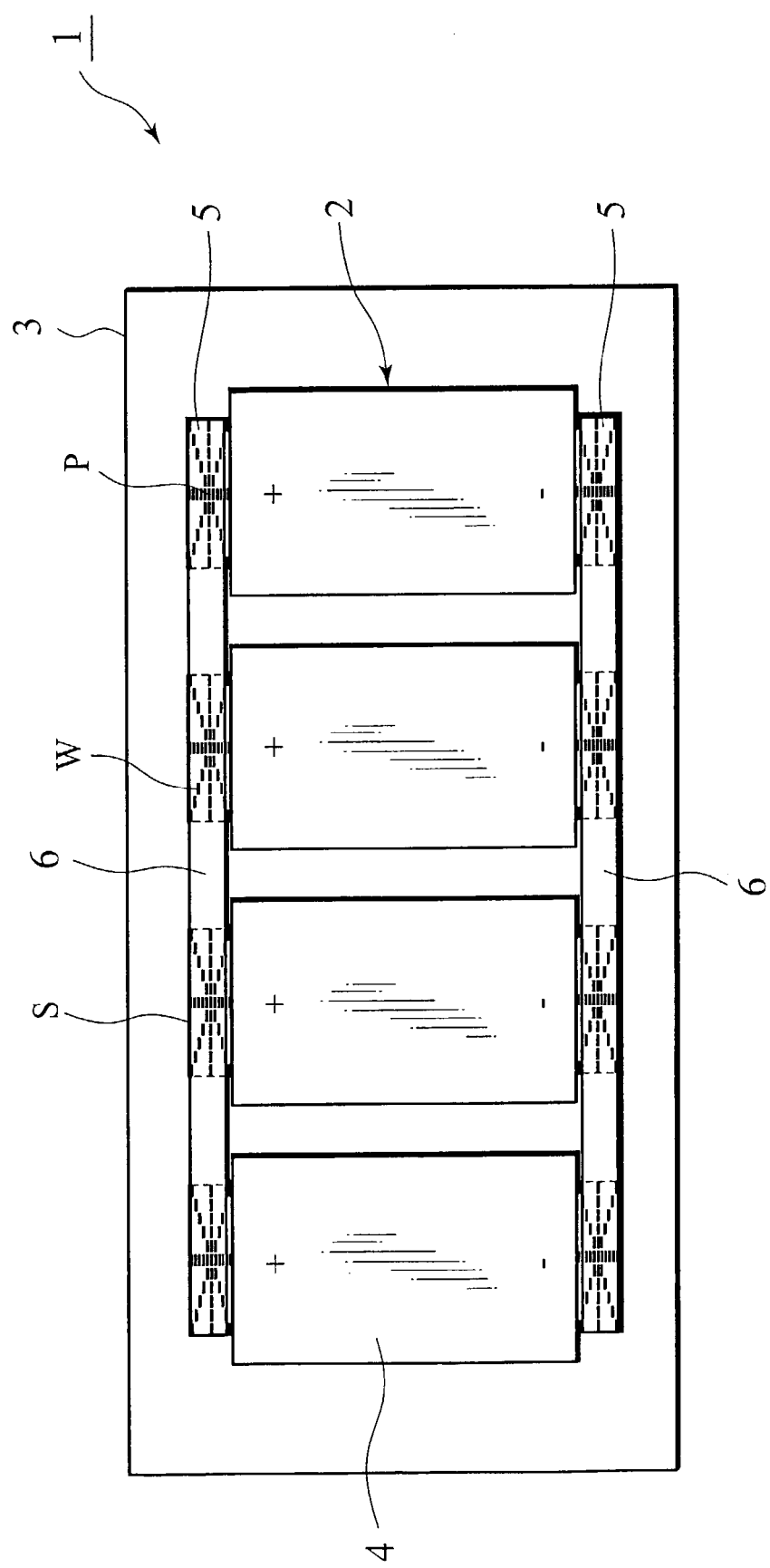
FIG. 16 is a view illustrating an electrically connected state of thin type laminate cells in a battery of a 13th embodiment according to the present invention.

The battery 1 of the presently filed embodiment fundamentally has the same structure as that of the 1st Embodiment but differs from the 1st Embodiment, as shown in FIG. 16, in that a plurality of laminate cells 2 are arranged in 4-parallel-4 series connection within the case 3. The battery 1 has a structure wherein the tabs 5 protruding from the cell bodies 4 of the thin type laminate cells 2 are mutually electrically connected to one another via the bus bars 6.

A test for the vibration transmissibility, which will be described later, of the battery 1 of the presently filed embodiment was conducted and the vibration transmissibility τ (dB) at the connected portions made by welding between the bus bar 6 and the tab 5 was measured to obtain a vibration spectrum substantially equal to the vibration spectrum A shown in FIG. 5.

(14th Embodiment)

Next, a 14th Embodiment of the present invention is described in detail with reference to FIGS. 17 to 19 and FIG. 5.

Figure 17:
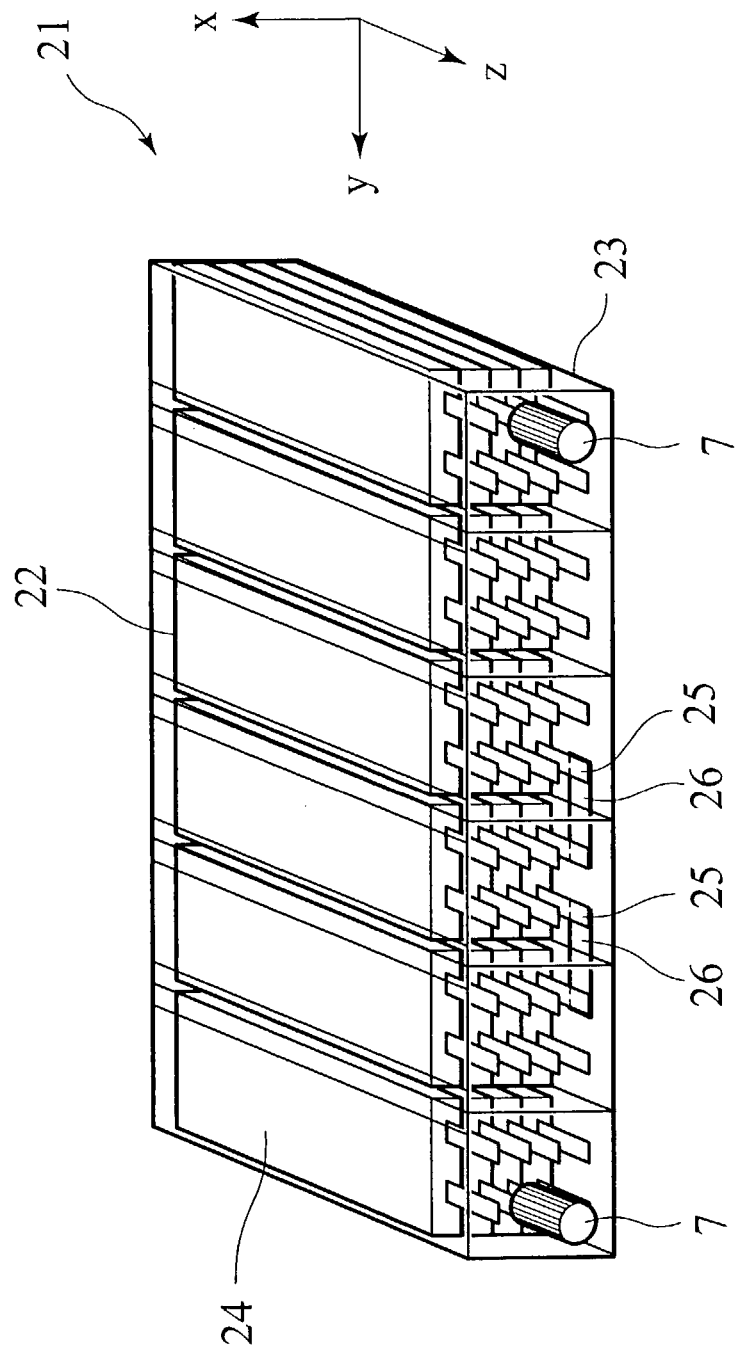
FIG. 17 is an overall perspective view illustrating a battery of a 14th embodiment according to the present invention in a transmissive manner.
Figure 18A:
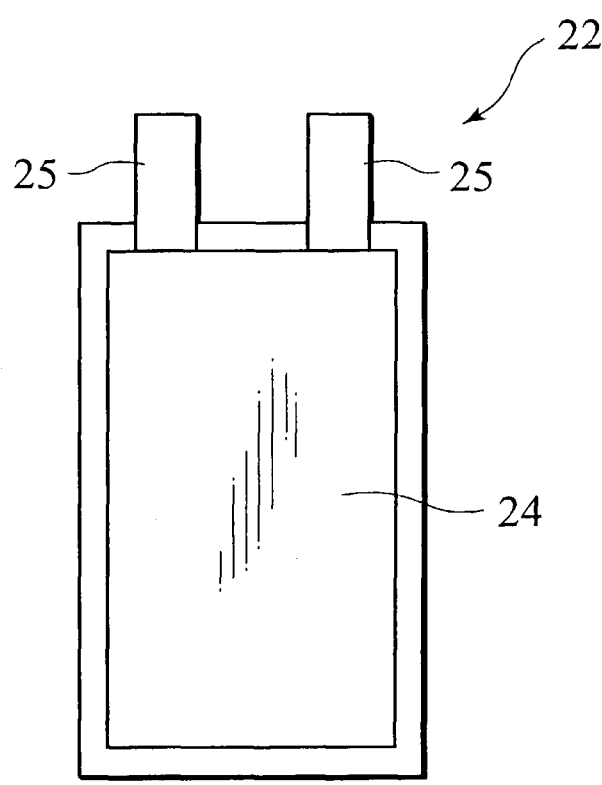
FIG. 18A is a plan view of a thin type laminate cell employed as a unit cell in the battery shown in FIG. 17 of the embodiment.
Figure 18B:
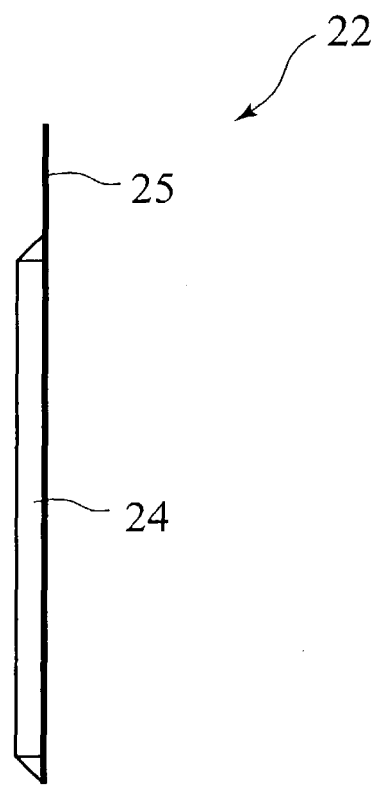
FIG. 18B is a side view of the thin type laminate cell shown in FIG. 18A of the embodiment.
Figure 19:
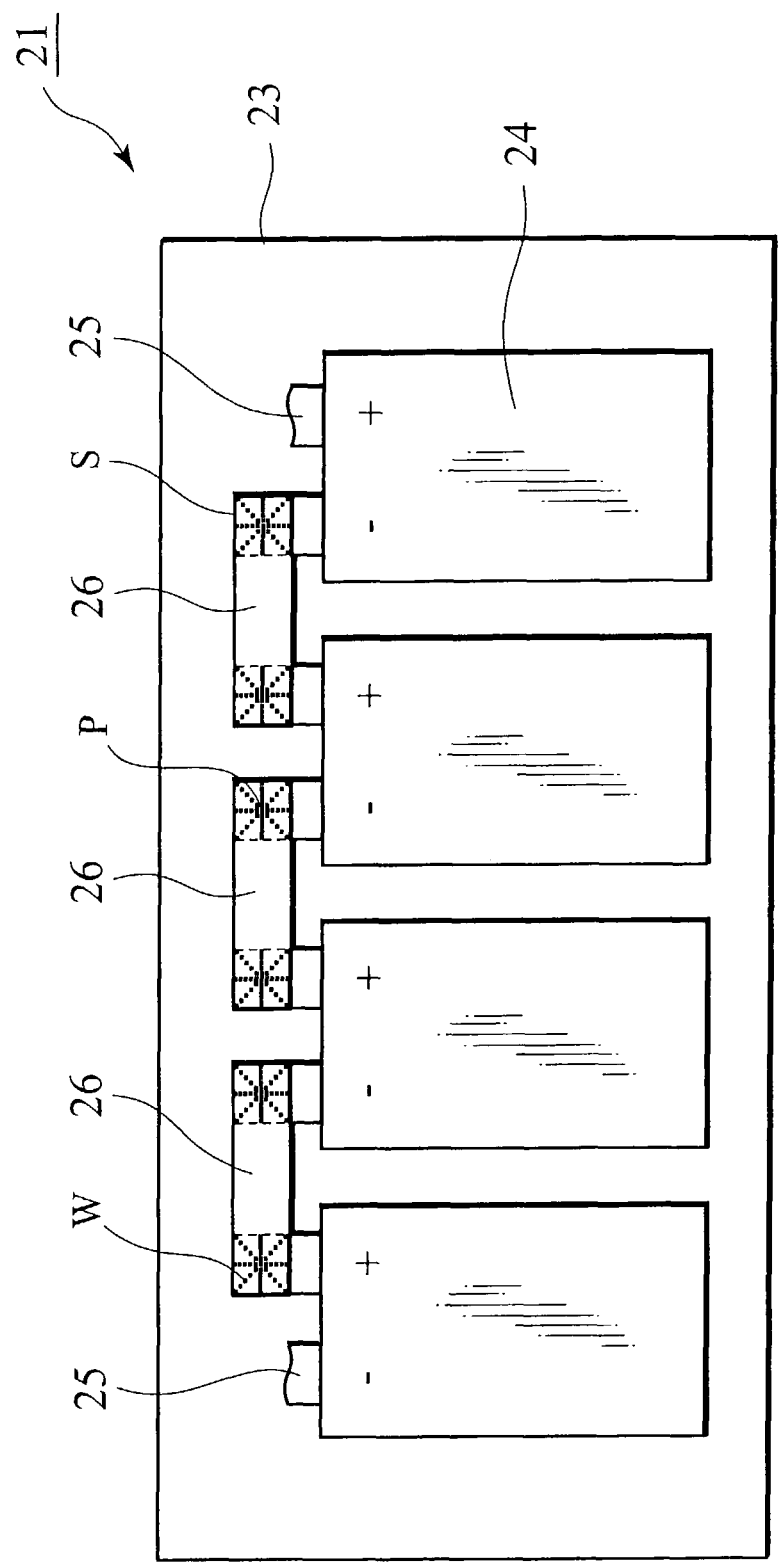
FIG. 19 is a view illustrating an electrically connected state of thin type laminate cells in the battery of the embodiment.

A battery 21 of the presently filed embodiment fundamentally has the same structure as that of the 1st Embodiment but differs from the 1st Embodiment in that unit cells 22, to be encompassed in a case 23 shown in FIG. 17, include thin type laminate cells 22 each having tabs 25 protruding from a cell body 24 in the same direction as shown in FIGS. 18A and 18B and, as shown in FIGS. 17 and 19 in simplified forms, such laminated cells 22 are disposed in the case 23 in bent conditions to provide 2-parallel-12-series connection. The battery 21 has a structure wherein the tabs 25 protruding from the cell bodies 24 of the thin type laminate cells 22 are mutually and electrically connected to one another via bus bars 26.

A test for the vibration transmissibility, which will be described later, of the battery 21 of the presently filed embodiment was conducted and the vibration transmissibility τ (dB) at the connected portions made by welding between the bus bar 26 and the tab 25 was measured to obtain a vibration spectrum substantially equal to the vibration spectrum A shown in FIG. 5.

(15th Embodiment)

Next, a 15th Embodiment of the present invention is described in detail with reference to FIGS. 20 and 5.

Figure 20:
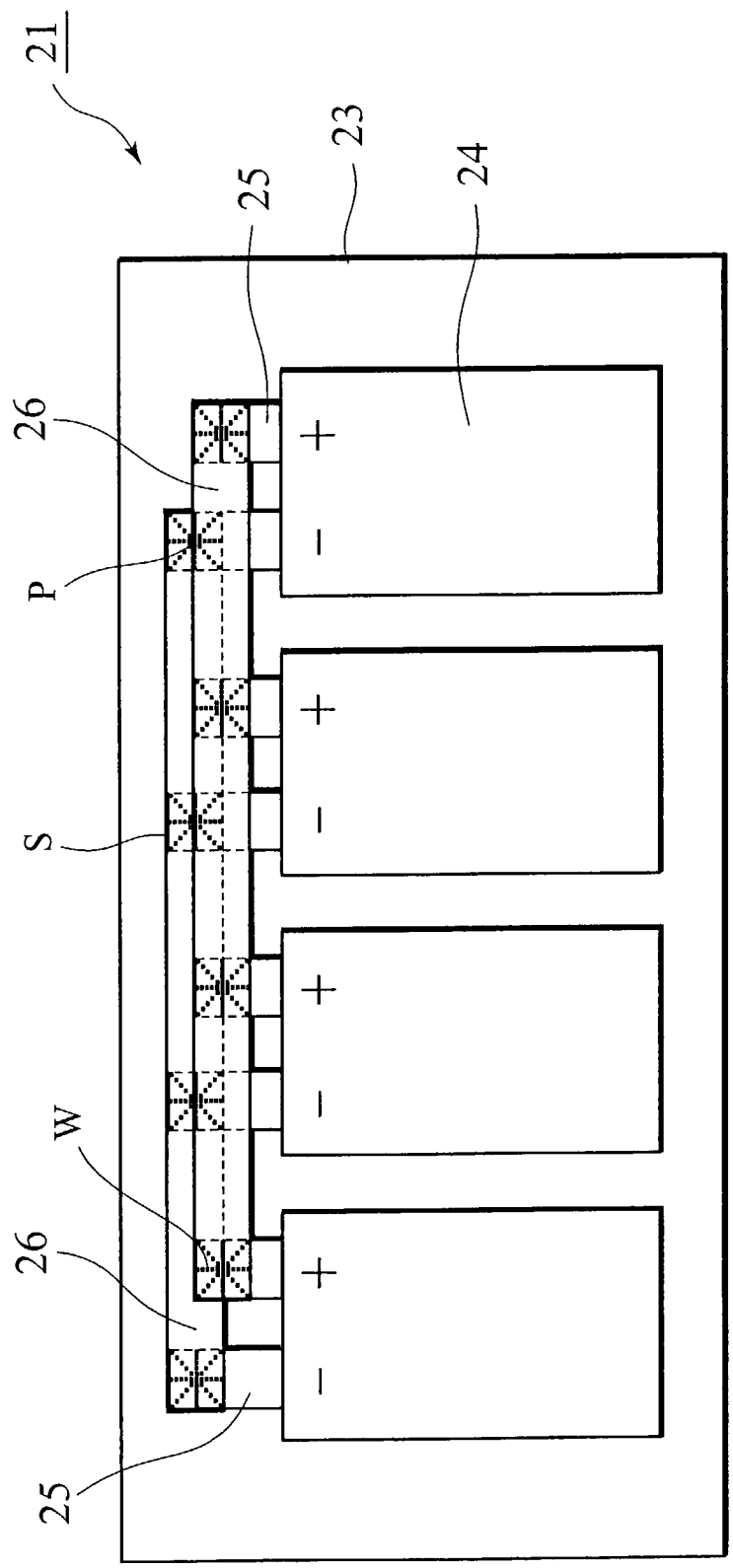
FIG. 20 is a view illustrating an electrically connected state of thin type laminate cells in a battery of a 15th embodiment according to the present invention.

The battery 21 of the presently filed embodiment fundamentally has the same structure as that of the 14th Embodiment but differs from the 14th Embodiment, as shown in FIG. 20, in that a plurality of thin type laminate cells 22 are disposed in the case 23 in a 4-parallel-6-series configuration. The battery 21 has a structure wherein the tabs 25 protruding, in the same direction, from the cell bodies 24 of the thin type laminate cells 22 are mutually and electrically connected to one another via the bus bars 26.

A test for the vibration transmissibility, which will be described later, of the battery 21 of the presently filed embodiment was conducted and the vibration transmissibility τ (dB) at the connected portions made by welding between the bus bar 26 and the tab 25 was measured to obtain a vibration spectrum substantially equal to the vibration spectrum A shown in FIG. 5.

Comparative Example 1

Next, Comparative Example 1 is described below in detail with reference to FIGS. 36A and 37.

Figure 36A:
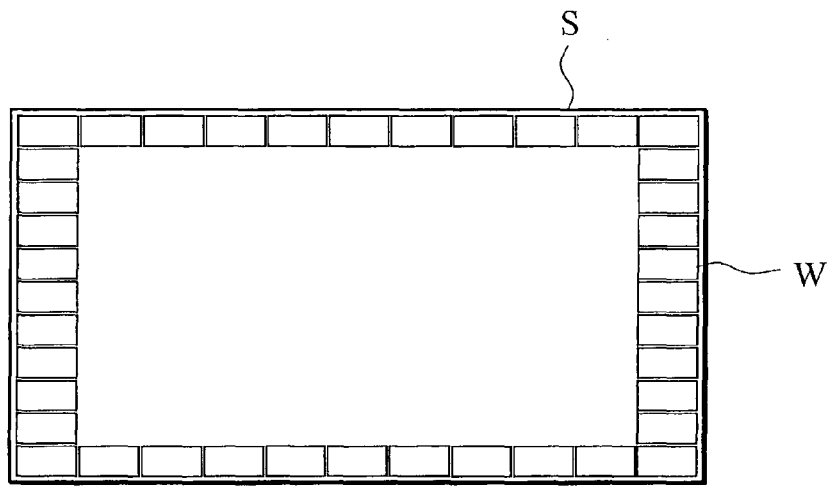
FIG. 36A is a view illustrating a locational pattern of welding points in an overlapped area between a tab of a thin type laminate cell and a bus bar in a battery of Comparative Example 1.

As shown in FIG. 36A, a battery of the presently filed Comparative Example has a structure wherein welding points W are located along a peripheral portion of an area S formed in a rectangular shape contour where the bus bar 6 and the tab 5 are overlapped with respect to one another, with the other structure being the same as that of the battery 1 of the 1st Embodiment.

A test for the vibration transmissibility, which will be described later, of the battery of the presently filed Comparative Example was conducted and the vibration transmissibility τ (dB) at the connected portions made by welding between the bus bar 6 and the tab 5 was measured to obtain a vibration spectrum G as shown in FIG. 37.

Comparative Example 2

Next, Comparative Example 2 is described below in detail with reference to FIGS. 36B and 37.

Figure 36B:
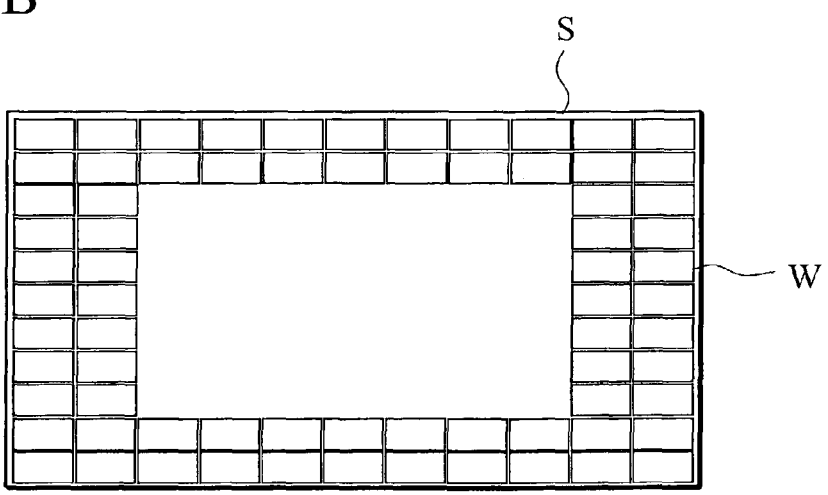
FIG. 36B is a view illustrating a locational pattern with an increased welding points in the overlapped area between a tab of a thin type laminate cell and a bus bar in a battery of Comparative Example 2.

As shown in FIG. 36B, a battery of the presently filed Comparative Example has a structure wherein welding points W are located in the same pattern as those of the battery of Comparative Example 1 with an additional increase in the number of welding points W, formed along the periphery of the area S, and an increase in the welded surface area while having the other same structure as that of the battery of Comparative Example 1.

A test for the vibration transmissibility, which will be described later, of the battery of the presently filed Comparative Example was conducted and the vibration transmissibility τ (dB) at the connected portions made by welding between the bus bar 6 and the tab 5 was measured to obtain a vibration spectrum H as shown in FIG. 37.

Reference Example

Next, Reference Example is described below in detail with reference to FIG. 38.

Figure 38:
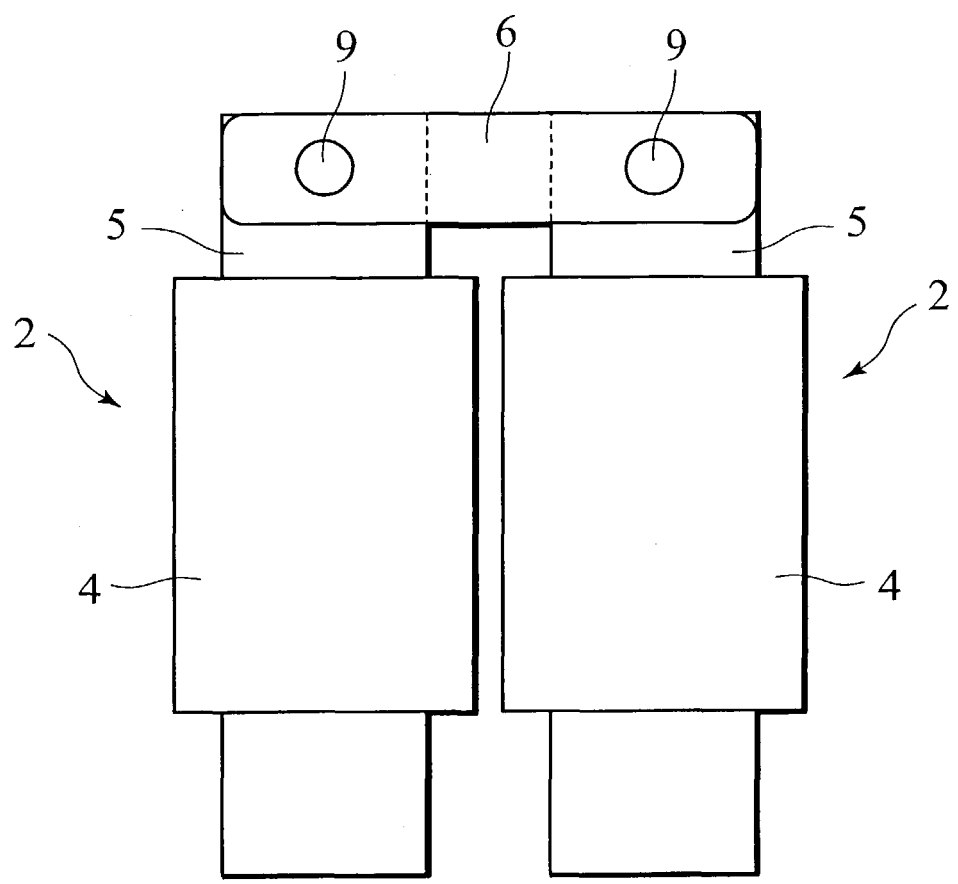
FIG. 38 is a view illustrating a connected condition between tabs of thin type laminate cells through a bas bar in a battery of Reference Example.

As shown in FIG. 38, a battery of Reference Example has a structure wherein the tabs 5 of the thin type laminate cells 2, serving as the unit cells, and the bus bar 6 are connected to one another by means of rivets 9, 9 while having the other same structure as that of the battery of the 1st Embodiment.

A test for the vibration transmissibility, which will be described later, of the battery of the presently filed Reference Example was conducted and the vibration transmissibility τ (dB) at the connected portions between the bus bar 6 and the tab 5 using rivets 9 was measured to obtain a vibration spectrum R as shown in FIG. 5. Also, the same vibration spectrum R is shown in FIGS. 7, 9, 11, 13, 15 and 37 for reference.

Tests of Vibration Transmissibility

Tests of vibration transmissibility set forth above are described in detail hereinafter.

In particular, acceleration pickups were placed at the center P of gravity (inclusive of the vicinities thereof) of the overlapped rectangular area between the bus bars 6, 26 and the tabs 5, 25 of the batteries of the above-described various embodiments, various Comparative Examples and Reference Example, and the vibration spectrums of the acceleration pickups resulting when a portion of the cases 3, 23 was subjected to a hammering effect exerted with an impulse hammer were measured.

Here, the acceleration pickup was set in a given position based on JIS B 0908 (Correction Method-Basic Concept For Vibration and Impact Pickup).

The vibration spectrums measured for the batteries of the various embodiments, various Comparative Examples and Reference Example were analyzed with FFT analyzer and converted in dimension of a frequency and acceleration. Averaging and smoothing of the frequencies obtained in such a way were conducted to obtain the vibration transmissibility spectrums that are illustrated respectively in the figures.

The battery of the Reference Example, using the rivets 9 that connects the bus bar 6 and the tab 5, was used as a reference, and in terms of an overhauled average value in a frequency range between 10 Hz and 800 Hz(equal to or greater than 10 Hz and equal to or smaller than 800 Hz), if the vibration transmissibility is equal to or higher than the reference by 5 dB, then the anti-vibration performance was regarded to be excellent (⊚), if the vibration transmissibility lies in a range greater than 0 dB and less than 5 dB, then the anti-vibration performance was regarded to be favorable (◯) and if the vibration transmissibility is equal to or less than 0 dB, then the anti-vibration performance was regarded to be unfavorable (x), obtaining judge results shown in the following Table 1.

vibration-resistant performance than that of Reference Example using the rivets to connect the bus bar and the tabs. Additionally, it is confirmed that less unevenness in contact resistance and an excellent heat dissipating property exist in the batteries of the various embodiments.

With the structures of the various embodiments set forth above, since the welding points between the bus bar and the tab are located in the overlapped area, between the bus bar and the tab, which needs vibration control, i.e., at the center of gravity of the vibration controlled area, which needs vibration control, and the vicinities thereof, and on at least one of the line segments radiately extending from the center of gravity, vibration incident to the central area of the vibration controlled area having the maximum amplitude is effectively

TABLE 1

|  | Unit Cell | Arrangement | Welding Pattern | Vibration Transmissibility | Vibra. Performance |
|---|---|---|---|---|---|
| Embodiment 1 | Laminate Cell 2 (FIG. 2) | 2-Parallel-8-Series (FIG. 3) | FIG. 4A | FIG. 5 | ⊚ |
| Embodiment 2 | Laminate Cell 2 (FIG. 2) | 2-Parallel-8-Series (FIG. 3) | FIG. 4B | FIG. 5 | ⊚ |
| Embodiment 3 | Laminate Cell 2 (FIG. 2) | 2-Parallel-8-Series (FIG. 3) | FIG. 6A | FIG. 7 | ◯ |
| Embodiment 4 | Laminate Cell 2 (FIG. 2) | 2-Parallel-8-Series (FIG. 3) | FIG. 6B | FIG. 7 | ⊚ |
| Embodiment 5 | Laminate Cell 2 (FIG. 2) | 2-Parallel-8-Series (FIG. 3) | FIG. 8A | FIG. 9 | ◯ |
| Embodiment 6 | Laminate Cell 2 (FIG. 2) | 2-Parallel-8-Series (FIG. 3) | FIG. 8B | FIG. 9 | ⊚ |
| Embodiment 7 | Laminate Cell 2 (FIG. 2) | 2-Parallel-8-Series (FIG. 3) | FIG. 10A | FIG. 11 | ◯ |
| Embodiment 8 | Laminate Cell 2 (FIG. 2) | 2-Parallel-8-Series (FIG. 3) | FIG. 10B | FIG. 11 | ⊚ |
| Embodiment 9 | Laminate Cell 2 (FIG. 2) | 2-Parallel-8-Series (FIG. 3) | FIG. 12A | FIG. 13 | ◯ |
| Embodiment 10 | Laminate Cell 2 (FIG. 2) | 2-Parallel-8-Series (FIG. 3) | FIG. 12B | FIG. 13 | ⊚ |
| Embodiment 11 | Laminate Cell 2 (FIG. 2) | 2-Parallel-8-Series (FIG. 3) | FIG. 14A | FIG. 15 | ◯ |
| Embodiment 12 | Laminate Cell 2 (FIG. 2) | 2-Parallel-8-Series (FIG. 3) | FIG. 14B | FIG. 15 | ⊚ |
| Embodiment 13 | Laminate Cell 2 (FIG. 2) | 4-Parallel-2-Series (FIG. 16) | FIG. 4A | FIG. 5 | ◯ |
| Embodiment 14 | Laminate Cell 22 (FIG. 18) | 2-Parallel-12-Series (FIG. 19) | FIG. 4A | FIG. 5 | ◯ |
| Embodiment 15 | Laminate Cell 22 (FIG. 18) | 4-Parallel-6-Series (FIG. 20) | FIG. 4A | FIG. 5 | ◯ |
| Comparative Example 1 | Laminate Cell 2 (FIG. 2) | 2-Parallel-8-Series (FIG. 3) | FIG. 36A | FIG. 22 | X |
| Comparative Example 2 | Laminate Cell 2 (FIG. 2) | 2-Parallel-8-Series (FIG. 3) | FIG. 36B | FIG. 22 | X |
| Reference Example | Laminate Cell 2 (FIG. 2) | 2-Parallel-8-Series (FIG. 3) | Rivets (FIG. 38) | FIG. 5 | — |

As will be appreciated from Table 1, it is understood that the batteries of the various embodiments have more excellent eliminated. In addition, since the welding points are not located in the entire part of the vibration controlled area but in the spot-like pattern, the bus bar and the tabs can be welded to one another with less pressing force and less energy required for welding than those required when welding the entire part of the vibration controlled area.

Further, typically in a case where the overlapped area between the bus bar and the tab has a contour formed in a rectangular shape, since the welding points are located on the diagonal line segments, extending from and on the line segment extending from the center of gravity of the vibration controlled area toward the center of at least one of the four sides, it becomes possible to effectively eliminate vibrations, occurring in the vibration modes of plural second degrees on the diagonal line segment, and vibrations occurring in the vibration modes of plural second degrees in respective directions parallel to the two sides that mutually intersect one another.

Further, since the plurality of unit cells of the battery can be connected in either one of the patterns among the parallel connection, the series connection, the parallel and series connection and the series and parallel connections, the battery is able to comply with various specifications, such as the specification, in which a high output voltage is required, and the specification in which a large capacity is required. In a case where a battery for a bicycle and a battery for an automobile with a need for a large capacity are structured using the unit cells suited for mobiles with a small capacity, the batteries of the various embodiments is able to reliably meet a desired requirement.

By using the thin type laminate cells as the plural unit cells of the battery, the thin tab of the laminate cell can be effectively utilized to suite a deformation from a deployed shape into an intensive shape and, when this takes place, no wasteful space exists in the laminate cell per se to provide a capability of effectively forming the battery in a compact structure. In addition, since the laminate cell of which outer wall is made of polymer film such as nylon has a lower dynamic spring constant than that of the can type battery, the vibration can be effectively eliminated. Namely, not only vibration can be effectively eliminated, but also ease of production, improvement in heat dissipating property and reduction in deterioration can be achieved.

(16th Embodiment)

Next, a 16th Embodiment of the present invention is described in detail with reference to FIGS. 21A and 21B.

A structure of a battery of the presently filed embodiment can be applied to the batteries of the 1st to 15th Embodiments described above and includes a thin type laminate cell 32 wherein a positive electrode plate 36A having an active material layer is joined to a current collector body 34A with its surface bonded with electrically conductive carbon material whereas a negative electrode plate 36B having an active material layer is joined to a current collector body 34B with its surface bonded with electrically conductive carbon material, with the electrode plates being stacked via a separator 37. And, the tab 35 and the current collector body 34A are connected to one another at three welding points w in a mutually overlapped area Sa each in a welded surface area of 1 mm$^2$ using an ultrasonic welding technique. Also, the tab 35 and the current collector body 34B are connected to one another in such a manner. And also, the separator 37 may be replaced with an electrolyte layer.

With the battery of the presently filed embodiment, the tabs 35, 35 of the thin type laminate cell 32 and the current collector bodies 34A, 34B are reliably connected to one another, and no burr BR occurs at a junction point between both components as shown in FIG. 21B, resulting in a capability of preventing an outer sheathing film PP on a surface of the laminated cell from being torn while enabling a self-discharge to be minimized.

(17th Embodiment)

Figure 22:
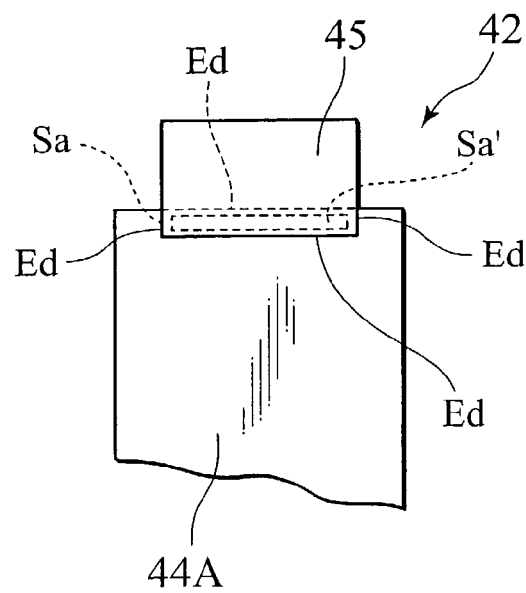
FIG. 22 is a partially enlarged plan view of a thin type laminate cell in a battery of a 17th embodiment according to the present invention.

Next, a 17th Embodiment of the present invention is described in detail with reference to FIG. 22.

A battery of the presently filed embodiment fundamentally has the same structure as that of the 16th Embodiment but differs therefrom in that the thin type laminate cell 42 is used wherein an ultrasonic welding is carried over an entire part Sa' of a cicumferential periphery at a boundary that is formed inward from each edge Ed of an area Sa by 0.5 mm such that a tab 45 and a current collector body 44A are mutually overlapped with respect to one another. Also, the tab 45 and the other current collector body are connected to one another in such a manner.

With the battery of the presently filed embodiment, not only the tabs of the thin type laminate cell 42 and the current collector bodies are reliably connected to one another, but also occurrence of burrs when carrying out the ultrasonic welding can be avoided and occurrence of upright of each tab and the associated current collector body can be restricted. No damage is caused in the outer sealing film PP of the surface of the laminate cell with less occurrence in self-discharge.

Self-Discharge Tests

Self-discharge tests were conducted using the thin type laminate cells 32, 34 of the batteries of the 16th and 17th Embodiments.

In particular, 100 pieces of the thin type laminate cells 32, 42 of the batteries of the 16th and 17th Embodiments were prepared respectively, and these thin type laminate cells 32, 42 are fully charged whereupon these cells were stored for one month under a circumstance of 25° C.

During such operation, 100 pieces of the thin type laminate cells (the thin type laminate cell with the tab and the current collector body being bonded using the spot welding) of the battery of Comparative Example 3, the thin type laminate cells (the thin type laminate cell with the mutually overlapped area between the tab and the current collector body being bonded over an entire area using the ultrasonic welding) of the battery of Comparative Example 4 and the thin type laminate cells (the thin type laminate cell with the mutually overlapped area between the tab and the current collector body being bonded at three welding points each with a welding surface of 0.5 mm$^2$ using the ultrasonic welding) of the battery of Comparative Example 5 were prepared, respectively. These thin type laminate cells were fully charged and left for one month under the circumference of 25° C. together with the thin type laminate cells 32, 42 of the batteries of the 16th and 17th Embodiments.

After an elapse of one month, the voltages of the respective thin type laminate cells were measured, and resulting values, obtained by subtracting these measured voltage values from initial voltage values occurring at the start of storages, are divided by the number of dates (30 days) whereupon the thin type laminate cell with a resulting value (the amount of self-discharge per day) equal to or above a value of 5 mV/day was regarded to be unfavorable, with the following results being obtained as shown in Table 2.

TABLE 2

| | Number of Unfavorable Pieces |
|---|---|
| Embodiment 16 | 0 |
| Embodiment 17 | 0 |
| Comparative Example 3 | 20 |

TABLE 2-continued

| | Number of Unfavorable Pieces |
|---|---|
| Comparative Example 4 | 12 |
| Comparative Example 5 | 8 |

As will be appreciated from above Table 2, there is no occurrence in the thin type laminate cells 32, 42, of the batteries of the 16th and 17th Embodiments, of which self-discharge is equal to or exceeds the value of 5 mV/day. On the contrary, there are 8 to 20 thin type laminate cells of the batteries of Comparative Examples 3 to 5, of which self-discharge is equal to or exceeds the value of 5 mV/day. From this, it is proved that any of the thin type laminate cells 32, 42 of the batteries of the 16th and 17th Embodiments has less amount of self-discharge, (18th Embodiment)

Next, an 18th Embodiment of the present invention is described in detail with reference to FIG. 23. Also, it is to be appreciated that while a battery of the presently filed embodiment is described below as having the same fundamental structure as that of the battery of the 1st Embodiment, a concept of the presently filed embodiment may be applied in principle to the respective batteries of the above-described 1st to 17th Embodiments.

Figure 23:
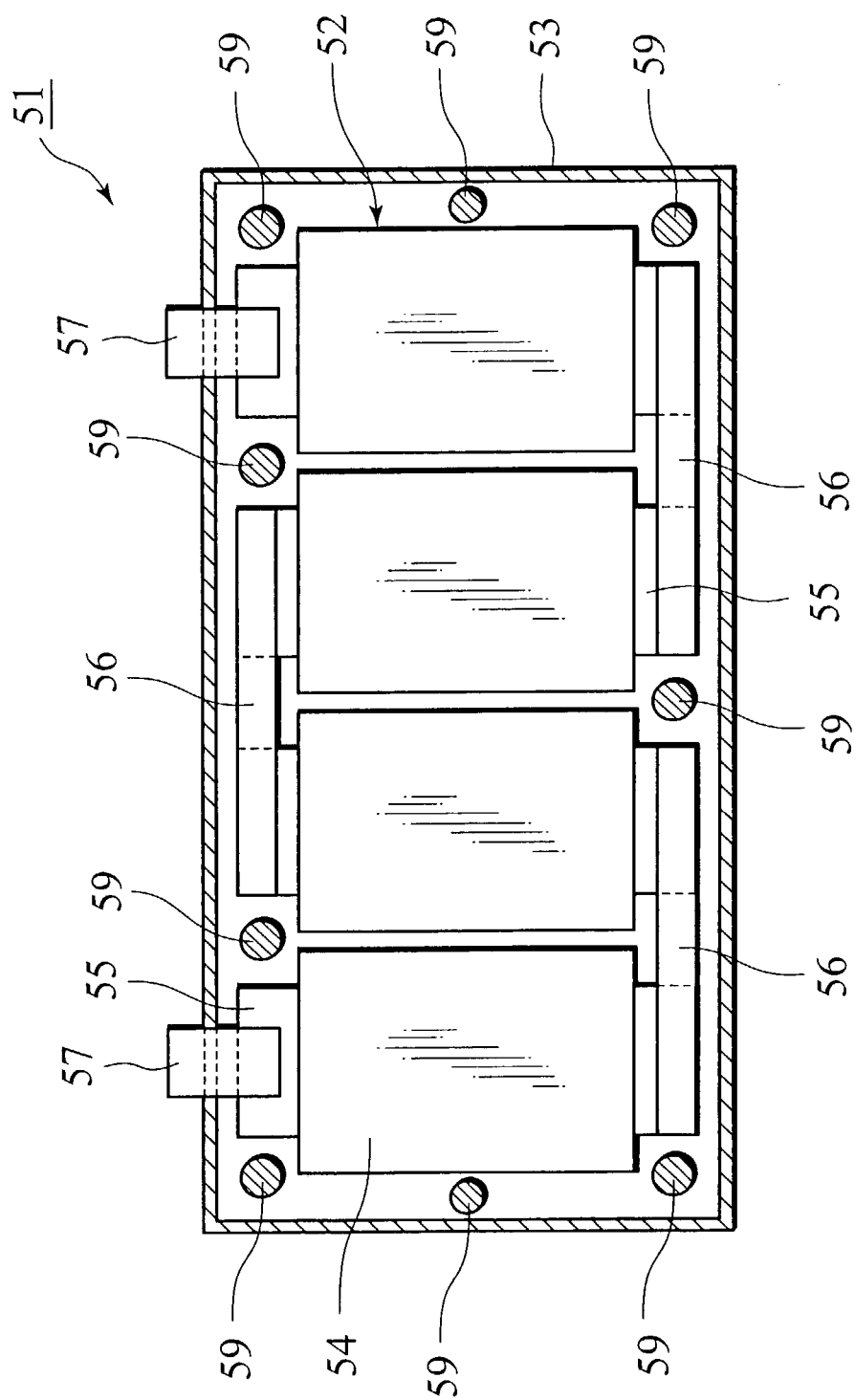
FIG. 23 is a schematic cross sectional view, taken by a y-z plane in an orthogonal coordinate system representatively shown in FIG. 1, of a battery of an 18th embodiment according to the present invention.

As shown in FIG. 23, a battery 51 of the presently filed embodiment has a structure wherein a plurality of thin type laminate cells 52, arranged in 2-paralle-8-series connection, are accommodated in a case 53 made of stainless steel with a thickness of 1 mm and tabs 55 protruding from cell bodies 54 of these thin type laminate cells 52 are electrically connected to one another via bus bars 56 made of copper each with a thickness of 2 mm. Here, the bus bar 56 and the associated tabs 55 are connected to one another by welding performed with the use of the ultrasonic welding machine. Also, reference numeral 57 in FIG. 23 designates a battery terminal made of copper with a thickness of 2 mm.

Further, interspersed in an internal space of the case 53 encompassing the plurality of thin type laminate cells 52 are desiccants 59, and the other structure of the battery 51 is the same as that of the battery 1 of the 1st Embodiment.

Further, in the presently filed embodiment, although the desiccants 59 are interspersed in the internal space of the case 53, at least either one of desiccant, hygroscopic material and water proofing material may be used to be interspersed in the internal space of the case 53.

Furthermore, the desiccant and hygroscopic material, which can be utilized in the following embodiments, may include at least one material selected from a group consisting of silica gel, active carbon, alumina, calcium chloride, sodium calcium, lime, $SiO_2$, $Fe_2O_3$, $Al_2O_3$, $Na_2O$, CaO, MgO and C, or in combination thereof. Moreover, although such desiccant or hygroscopic material may be confined in respective volumes in compliance with an available space inside the case 53, a thickness (a wall thickness of an adhered portion) of each of these volumes may be determined to preferably have a range between 0.5 mm and 10 mm (equal to or greater than 0.5 mm and equal to or smaller than 10 mm) so as to achieve a desired function with no increase in weight.

In addition, waterproofing material, which can be utilized in the following embodiments, may include a material such as not only polyethylene terephthalate and nylon, but also epoxy series resin, olefin series resin and urethane series resin. Also, although such waterproofing material may be determined to have a volume in compliance with the space inside the case 53, a thickness (a wall thickness of an adhered portion) of the waterproofing material may be determined to preferably fall in a range between 0.1 mm and 5 mm (equal to or greater than 0.1 mm and equal to or smaller than 5 mm) so as to achieve a desired function with no increase in weight.

With the structure of the battery 51 of the presently filed embodiment set forth above, since the desiccant 59 is typically distributedly interposed in the space between the adjacent thin type laminate cells 52 inside the case 53, water is prevented from penetrating the internal part of the thin type laminate cell 52 due to the dried condition in the case 53 and, accordingly, no expansion is caused in the thin type laminate cell 52 with a resultant improvement in durability.

(19th Embodiment)

Next, an 19th Embodiment of the present invention is described in detail with reference to FIG. 24.

Figure 24:
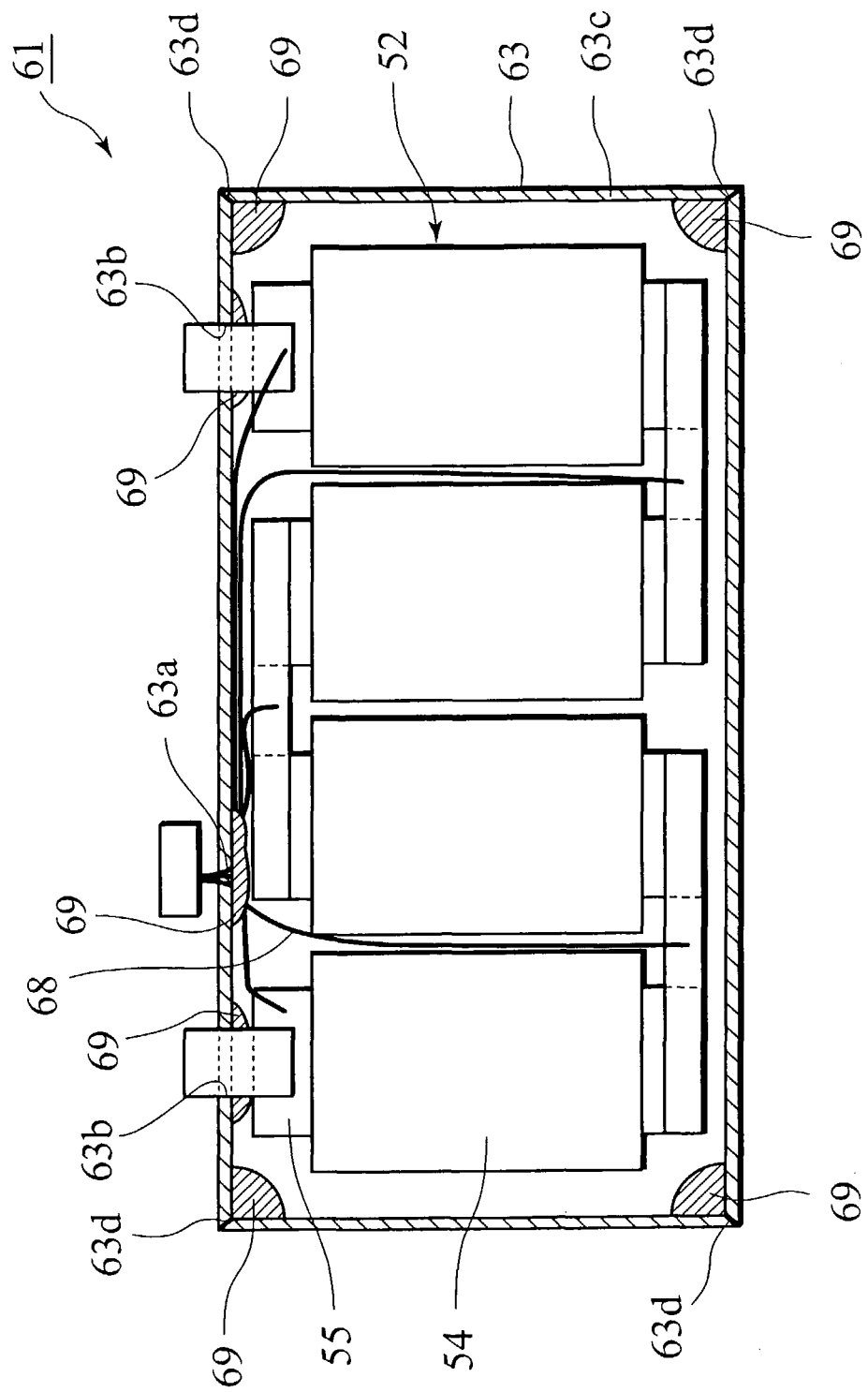
FIG. 24 is a schematic cross sectional view, taken by the y-z plane, of a battery of a 19th embodiment according to the present invention.

As shown in FIG. 24, a battery 61 of the presently filed embodiment has the same fundamental structure as that of the battery 51 of the 18th Embodiment but differs therefrom in that desiccants 69 are disposed in areas where gaps are created in a case 63, i.e., areas associated with a bore 63a for wiring a lead 68 therethrough, terminal insertion apertures 63b and joints 63d between adjacent case component plates 63c.

Also, while the battery of the presently filed embodiment has been described as having the desiccants 69 disposed in the areas where the gaps are apt to occur in the case 63, at least either one of the desiccant, the hygroscopic material and the waterproofing material may be disposed in those areas.

With the structure of the battery 61 of the presently filed embodiment set forth above, since the desiccants 69 are disposed in the areas where the gaps are apt to be created inside the case 63, water is prevented from penetrating the internal part of the thin type laminate cell 52 due to the dried condition in the case 63 and, accordingly, no expansion is caused in the thin type laminate cell 52 with a resultant improvement in durability.

(20th Embodiment)

Next, a 20th Embodiment of the present invention is described in detail with reference to FIG. 25.

Figure 25:
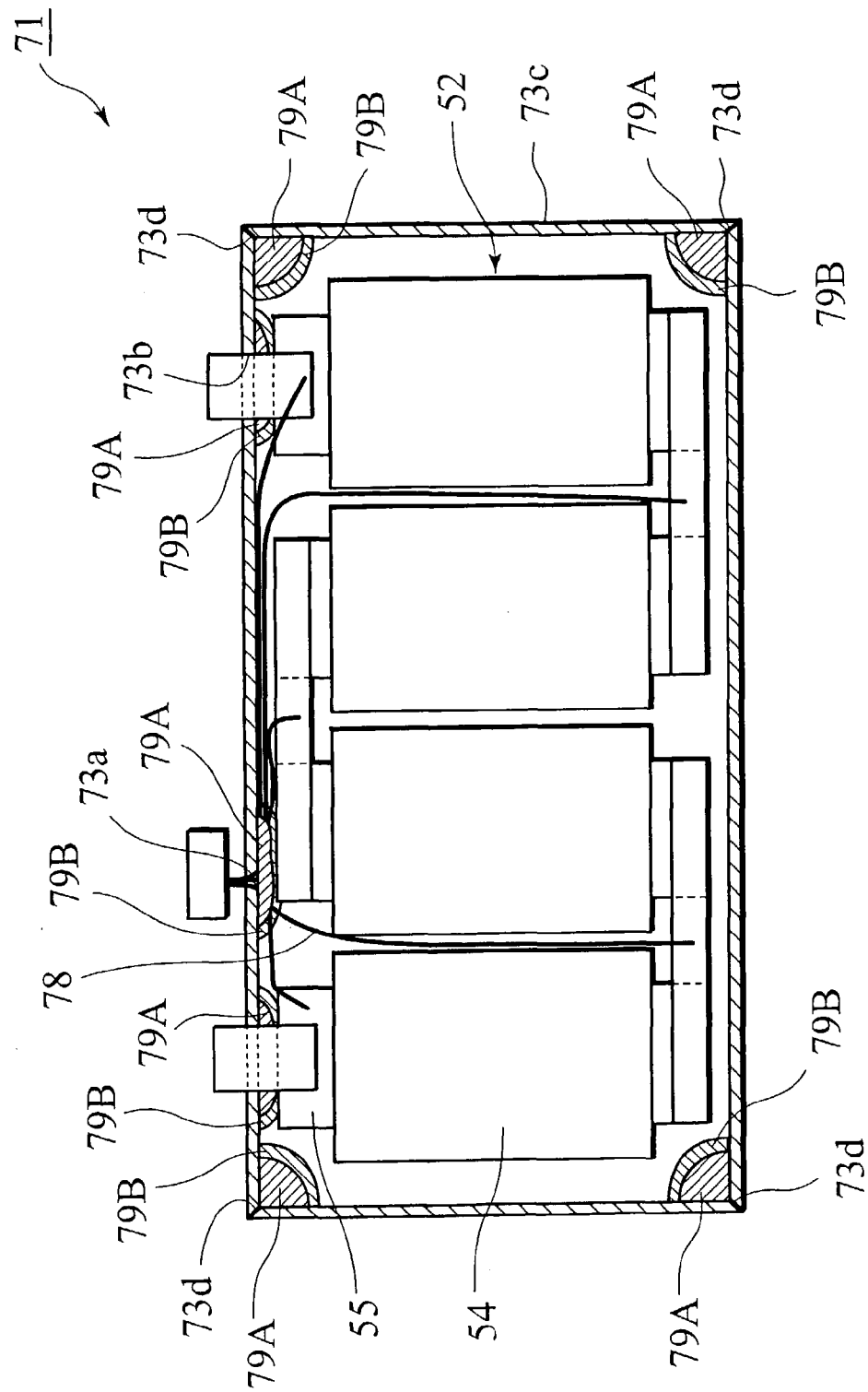
FIG. 25 is a schematic cross sectional view, taken by the y-z plane, of a battery of a 20th embodiment according to the present invention.

As shown in FIG. 25, a battery 71 of the presently filed embodiment has the same fundamental structure as that of the battery 61 of the 19th Embodiment but differs therefrom in that waterproofing materials 79A are disposed in areas where gaps are created in a case 73, i.e., areas associated with a bore 73a for wiring a lead 78 therethrough, terminal insertion apertures 73b and joints 73d between adjacent case component plates 73c and, additionally, desiccants 79B are laminated over the waterproofing materials 79A.

Also, while with the battery of the presently filed embodiment, the waterproofing materials 79A are disposed in the areas where the gaps are apt to occur in the case 73 whereupon the desiccants 79B are laminated over the waterproofing materials 79A, at least either one of the desiccant, the hygroscopic material and the waterproofing material may be laminated.

Further, the waterproofing material 79A may similarly include materials such as polyethylene terephthalate and nylon.

With the structure of the battery 71 of the presently filed embodiment set forth above, since the waterproofing materials 79A and the desiccants 79B are disposed in the areas, in the laminated condition, where the gaps are apt to be created inside the case 73, water is prevented from penetrating the internal part of the thin type laminate cell 52 in a further reliable fashion than that of the battery 61 of the 19th Embodiment set forth above and, accordingly, a further improved durability is provided.

(21st Embodiment)

Next, a 21st Embodiment of the present invention is described in detail with reference to FIG. 26.

Figure 26:
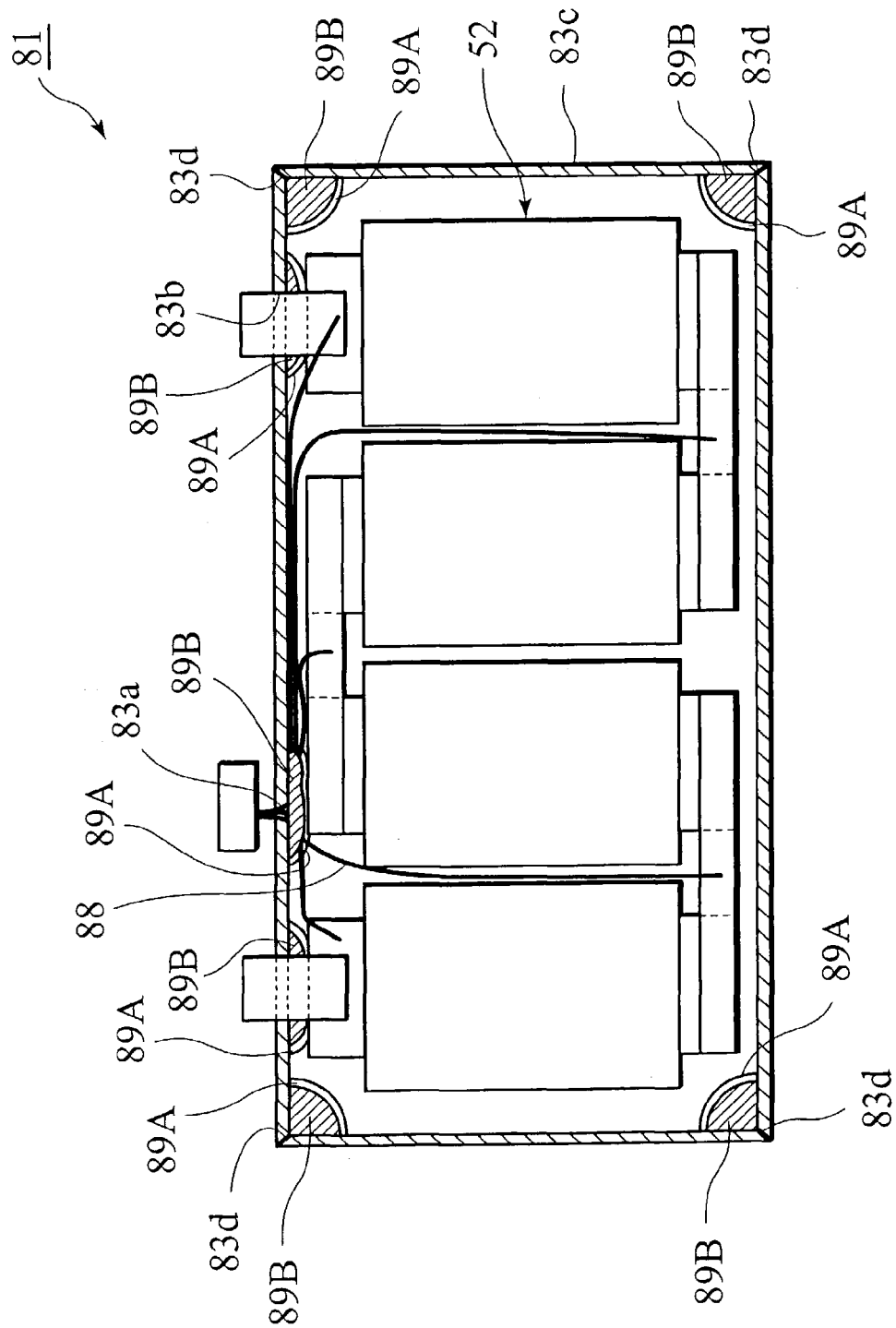
FIG. 26 is a schematic cross sectional view, taken by the y-z plane, of a battery of a 21st embodiment according to the present invention.

As shown in FIG. 26, a battery 81 of the presently filed embodiment has the same fundamental structure as that of the battery 71 of the 20th Embodiment but differs therefrom in that desiccants 89B are disposed in areas where gaps are created in a case 83, i.e., areas associated with a bore 83a for wiring a lead 88 therethrough, terminal insertion apertures 83b and joints 83d between adjacent case component plates 83c and, additionally, waterproofing materials 89A are laminated over the desiccants 89B.

Also, while with the battery of the presently filed embodiment, the desiccants 89B are disposed in the areas where the gaps are apt to occur in the case 83, at least either one of the desiccant and the hygroscopic material may be preliminarily located in those areas.

Further, the waterproofing material 89A to be laminated over the desiccants 89B may similarly include materials such as not only polyethylene terephthalate and nylon but also epoxy series resin, olefin series resin and urethane series resin. Also, the waterproofing material may similarly have a thickness in a range between 0.1 mm and 5 mm (equal to or greater than 0.1 mm and equal to or smaller than 5 mm) to provide a desired function without an increase in weight.

With the structure of the battery 81 of the presently filed embodiment set forth above, since the desiccants 89B and the waterproofing materials 89A are disposed in the areas, in the laminated condition, where the gaps are apt to be created inside the case 83, water is prevented from penetrating the internal part of the thin type laminate cell 52 in a further reliable fashion than that of the battery 61 of the 19th Embodiment set forth above and, accordingly, a further improved durability is provided.

(22nd Embodiment)

Next, a 22nd Embodiment of the present invention is described in detail with reference to FIG. 27.

Figure 27:
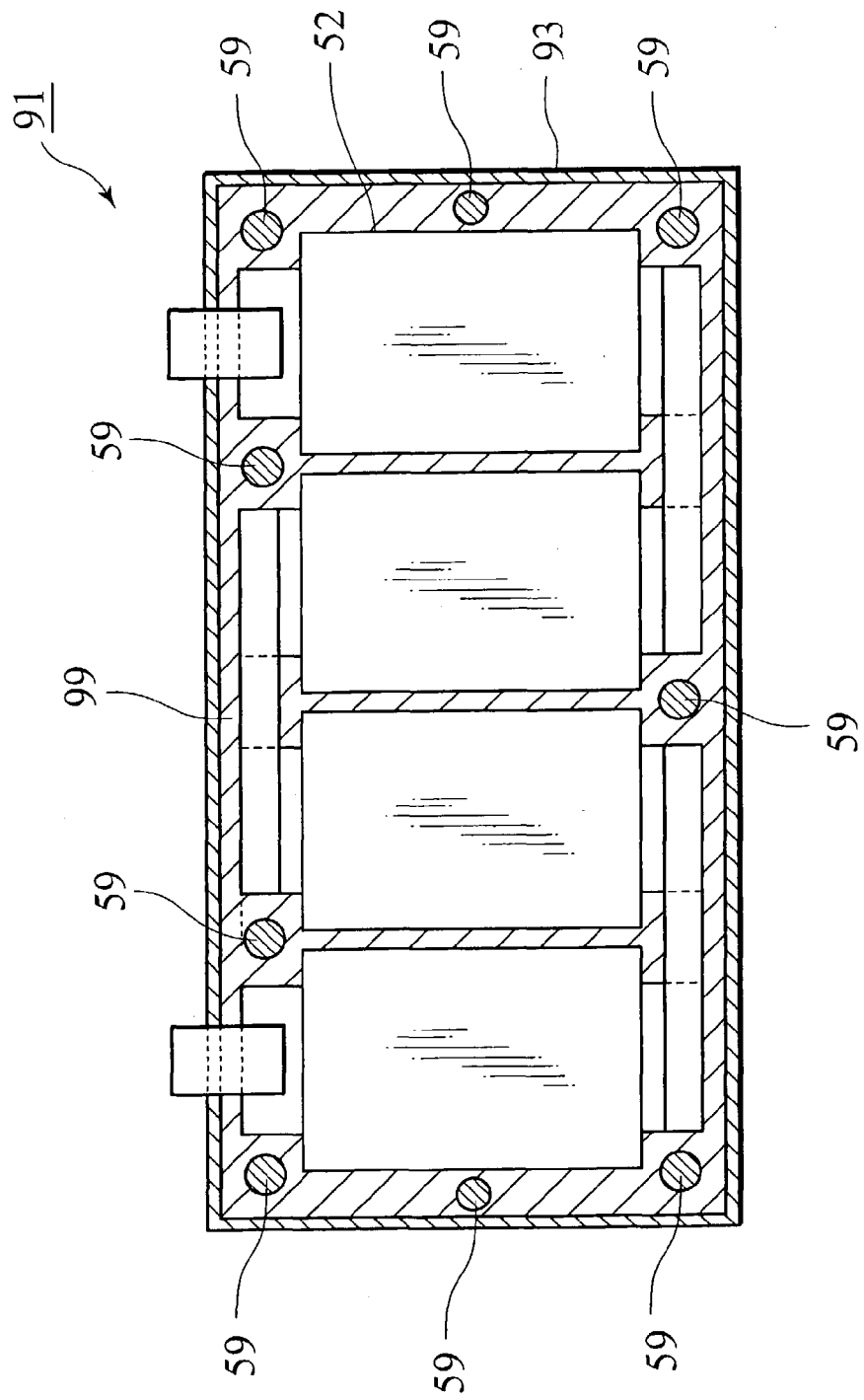
FIG. 27 is a schematic cross sectional view, taken by the y-z plane, of a battery of a 22nd embodiment according to the present invention.

As shown in FIG. 27, a battery 91 of the presently filed embodiment has the same fundamental structure as that of the battery 51 of the 18th Embodiment set forth above but differs therefrom in that potting material 99 is filled in an internal space of a case 93.

Such potting material 99 is composed of resin filled inside the case 93 of the battery 91 and plays as a role not only to prevent the vibration from being transmitted to the thin type laminate cells 52 but also to protect the thin type laminated cell 52 from outer environments.

Consequently, a waterproofing property, a moisture-proof property, a hot and cold cycle property, a heat-resistant stability, an insulation property and a fire-retardant property are indispensable for the potting material and, because of these reasons, the potting material 99 may be preferably selected from a group consisting of epoxy series resin, urethane series resin, nylon series resin and olefin series resin in a single or in combination of these compounds. Among these materials, since the urethane resin is particularly excellent in such a performance, the urethane series resin may be preferably used as resin to be filled in the case 93 of the battery 91.

Of course, the present invention is not limited to such resin group set forth above, and the potting material may include a resin group, which satisfies the various performances set forth above, such as silicone rubber and olefin series elastomer.

Further, the presence of optimum resin selectively located in areas where gaps are created in a case 93, i.e., areas associated with a bore for wiring, terminal insertion apertures and joints between adjacent case component plates enables an effective vibration-free property to be provided, and a plurality of the above-described resin materials may be used in a mixed condition to provide an effective result.

With the structure of the battery 91 of the presently filed embodiment set forth above, since the desiccants 59 are interspersed in the case 93 and the potting material 99 is filled in the spaces between the thin type laminate cells 52, not only the waterproofing property but also the vibration-resistant property can be improved.

(23rd Embodiment)

Next, a 23rd Embodiment of the present invention is described in detail with reference to FIG. 28.

Figure 28:
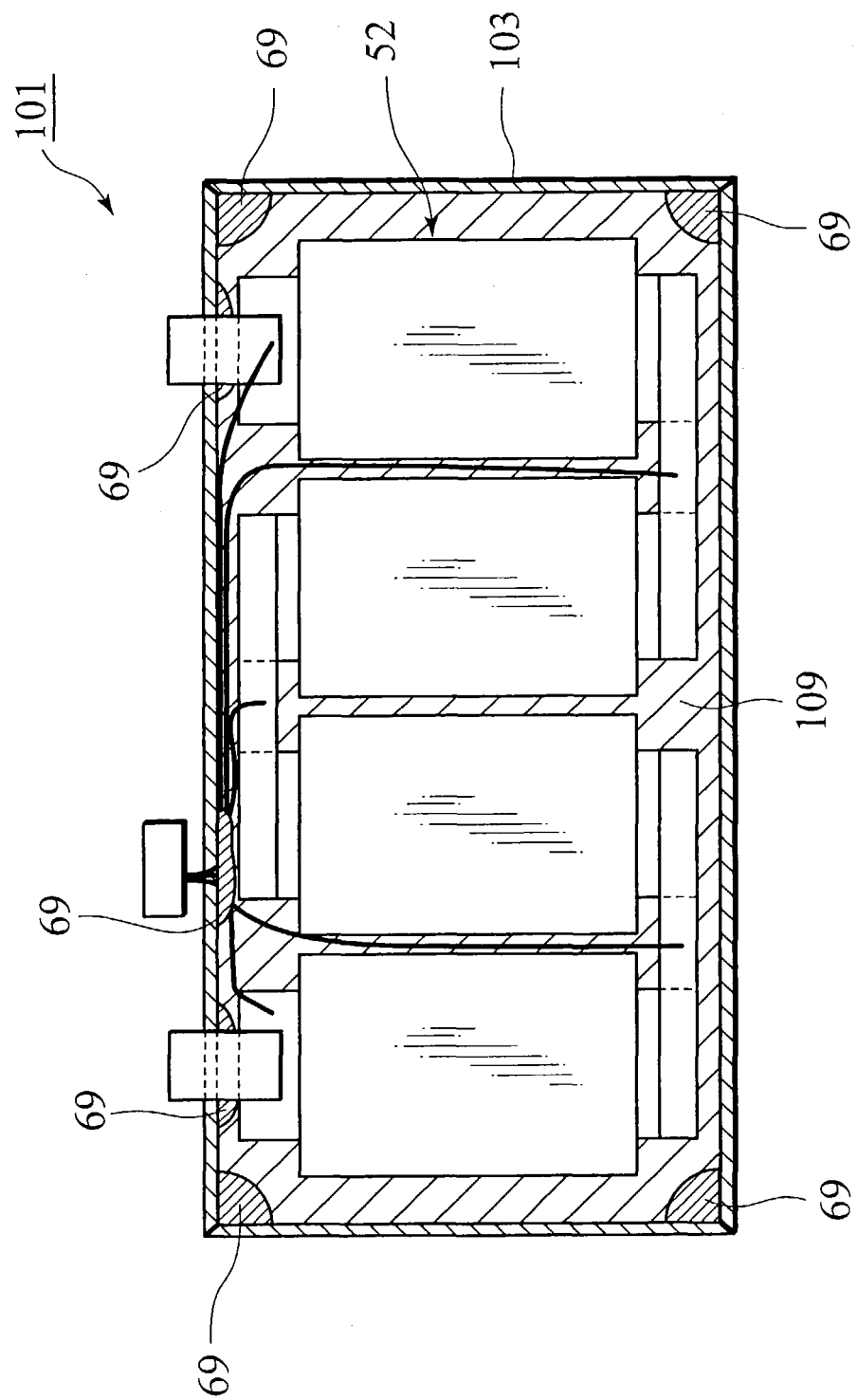
FIG. 28 is a schematic cross sectional view, taken by the y-z plane, of a battery of a 23rd embodiment according to the present invention.

As shown in FIG. 28, a battery 101 of the presently filed embodiment has the same fundamental structure as that of the battery 61 of the 19th Embodiment set forth above but differs therefrom in that potting material 109 is filled in an internal space of a case 103.

Such potting material 109 is composed of resin filled inside the case 103 of the battery 101 and plays as a role not only to prevent the vibration from being transmitted to the thin type laminated cells 52 but also to protect the thin type laminate cells 52 from outer environments.

With the structure of the battery 101 of the presently filed embodiment set forth above, since the potting material 109 is filled in the internal spaces of the case 103, not only the waterproofing property but also the vibration-resistant property can be improved like in the 22nd Embodiment.

(24th Embodiment)

Next, a 24th Embodiment of the present invention is described in detail with reference to FIG. 29. Also, a fundamental structure of a battery of the presently filed embodiment can be applied to the respective batteries of the 18th to 23rd Embodiments.

Figure 29:
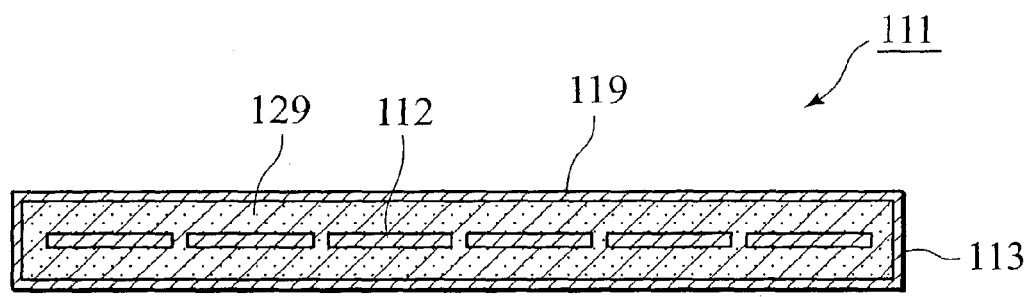
FIG. 29 is a schematic cross sectional view, taken by an x-y plane in the orthogonal coordinate system representatively shown in FIG. 1, of a battery of a 24th embodiment according to the present invention.

As shown in FIG. 29, a battery 111 of the presently filed embodiment has a structure wherein a mixture of potting material 129 and hygroscopic material 119 is filled in an internal space in a case 113 encompassing a plurality of thin type laminate cells 112.

In such a way set forth above, when mixing the hygroscopic material 119 into the potting material 129, it is preferred that a mixing ratio of the hygroscopic material relative to an entire part falls in a range between 5% and 50% (equal to or greater than 5% and equal to or smaller than 50%). If the mixture ratio is below 5%, no effect of the hygroscopic property is obtained and, in contrast, if the mixture ratio exceeds 50%, then it is hard for the potting material to be hardened.

Also, while in the presently filed embodiment, the hygroscopic material 119 is mixed with the potting material 129, either one of the desiccant and the hygroscopic material may be mixed with the potting material.

Figure 30:
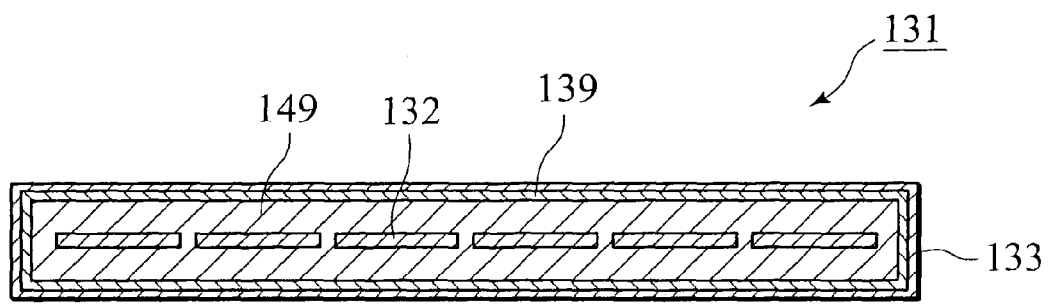
FIG. 30 is a schematic cross sectional view, taken by the x-y plane, of a battery of a 25th embodiment according to the present invention.

As shown in FIG. 30, a battery 131 of the presently filed embodiment has a structure wherein an inner wall of a case 133, encompassing a plurality of thin type laminate cells 132, is covered with a hygroscopic material 139 and additionally potting material 149 is filled in an internal space of a case 133.

The battery 111 of the presently filed embodiment, with the structure set forth above, is able to improve not only the waterproofing property but also the vibration-resistant property as in the 22nd and 23rd Embodiments.

(25th Embodiment)

Next, a 25th Embodiment of the present invention is described in detail with reference to FIG. 30. Also, a fundamental structure of a battery of the presently filed embodiment can be applied to the respective batteries of the 18th to 23rd Embodiments.

As shown in FIG. 30, a battery 131 of the presently filed embodiment has a structure wherein an inner wall of a case 133, encompassing a plurality of thin type laminate cells 132, is covered with a hygroscopic material 139 and additionally potting material 149 is filled in an internal space of a case 133.

Also, with the presently filed embodiment, although the inner wall of the case 133 is covered with the hygroscopic material 139 and, in addition, the potting material 149 is filled in the internal space of the case 133, the inner wall of the case 133 may be covered with at least either one of the desiccant, the hygroscopic material and the waterproofing material.

The battery 131 of the presently filed embodiment, with the structure set forth above, is able to improve not only the waterproofing property but also the vibration-resistant property as in the batteries 91, 101 of the 22nd and 23rd Embodiments.

(26th Embodiment)

Next, a 26th Embodiment of the present invention is described in detail with reference to FIGS. 31A and 31B. Also, a fundamental structure of a battery of the presently filed embodiment can be applied to the respective batteries of the 1st to 25th Embodiments.

As shown in FIGS. 31A and 31B, with a battery of the presently filed embodiment, a thin type laminate cell 152 has a structure wherein a desiccant material 159 such as $SiO_2$ is directly coated over a laminate outer sheath 152a at an area except for a tab 155.

Also, with the presently filed embodiment, although the desiccant 159 is directly coated over the laminated outer sheath 152a, hygroscopic material may be directly coated over the outer sheath 152a. Also, the desiccant or the hygroscopic material may preferably have a thickness LD in a range between 0.5 mm and 10 mm (equal to or greater than 0.5 mm and equal to or smaller than 10 mm) to provide a desired function with no deterioration in a heat dissipating property and no increase in weight.

With such a structure of the battery of the presently filed embodiment set forth above, since the thin type laminate cell 152 wherein the desiccant 159 is disposed over the laminated sheath 152a is used, no penetration of water into the interior of the thin type laminate cell 152 occurs, resulting in a capability of preventing not only an operating performance but also a heat dissipating performance of the cell body 154 from being deteriorated.

(27th Embodiment)

Next, a 27th Embodiment of the present invention is described in detail with reference to FIG. 32. Also, a fundamental structure of a battery of the presently filed embodiment can be applied to the respective batteries of the 1st to 25th Embodiments.

Figure 32:
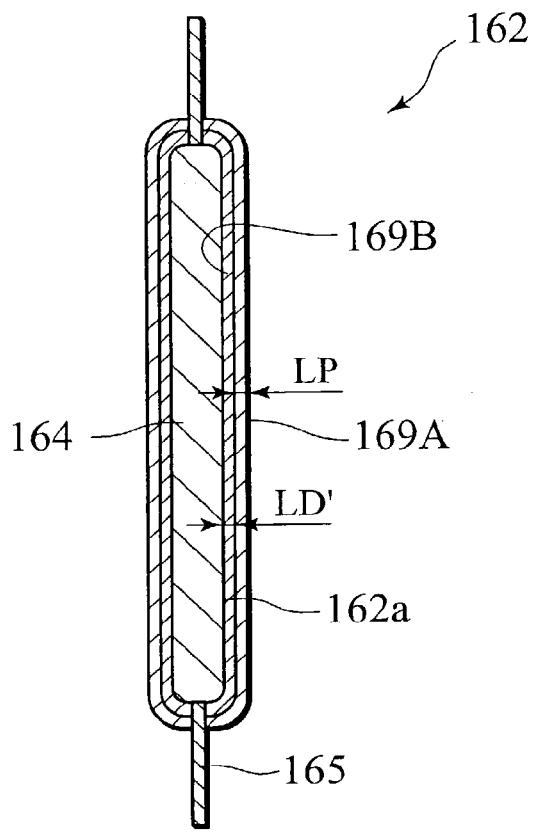
FIG. 32 is a schematic cross sectional view, taken by the x-z plane, of a thin type laminate cell in a battery of a 27th embodiment according to the present invention.

As shown in FIG. 32, with a battery of the presently filed embodiment, a thin type laminate cell 162 has a structure wherein desiccant material is directly coated over a laminate outer sheath 162a at an area except for a tab 165 and additionally, waterproofing material 169A, made of urethane series resin, is entirely coated over the desiccant 169B, which is previously coated. Also, in consideration that the desiccant 169B is previously coated, the waterproofing material 169A may have a thickness LP in a range between 0.2 mm and 5 mm (equal to or greater than 0.2 mm and equal to or smaller than 5 mm) to provide a desired function without an increase in weight.

Further, with the presently filed embodiment, although the desiccant 169B is directly coated over the laminate outer sheath 162a, a hygroscopic material may be directly coated over the outer sheath 162a. Also, the desiccant or the hygroscopic material may preferably have a thickness LD' in a range between 0.2 mm and 5 mm (equal to or greater than 0.2 mm and equal to or smaller than 5 mm) to provide a desired function with no deterioration in a heat dissipating property and no increase in weight.

With such a structure of the battery of the presently filed embodiment set forth above, the waterproofing performance of the thin type laminated cell 162 becomes higher to the extent additionally provided by the waterproofing material 169A entirely coated over the desiccant 169B.

Water Entrance Tests and Heat Dissipating Performance Tests

First, water entrance tests were conducted using the thin type laminate cell 152, directly coated with the desiccant 159 made of SiO2, of the battery of the 26th Embodiment.

To this end, the thin type laminate cells 152 of the batteries of the 26th Embodiment were prepared including the thin type laminate cell (Embodiment 26A) having the desiccant 159 with a thickness of 0.5 mm, the thin type laminate cell (Embodiment 26B) having the desiccant 159 with a thickness of 1 mm, the thin type laminate cell (Embodiment 26C) having the desiccant 159 with a thickness of 5 mm, and the thin type laminate cell (Embodiment 26D) having the desiccant 159 with a thickness of 10 mm, and these laminated cells 152 were stored for three months under the environment of the temperature 25° C. and the humidity of 50%.

In contrast, the thin type laminate cell (thin type laminate cell wherein the thin type laminate cell 152 of the battery of the 26th Embodiment is provided with the desiccant 159 with a thickness of 0.1 mm) of the battery of Comparative Example 6 and the thin type laminate cell (thin type laminate cell wherein the thin type laminate cell 152 of the battery of the 26th Embodiment is provided with the desiccant 159 with a thickness of 15 mm) of the battery of Comparative Example 7 were prepared, and these laminated cells were stored, together with the thin type laminate cells 152 of the batteries of the above-described Embodiments 26A to 26D, for three months under the environment of the temperature 25° C. and the humidity of 50%.

After an elapse of three months, the amounts of entrance of water into respective laminate cells were measured in a so-called Karl Fischer method, obtaining results shown in Table 3.

TABLE 3

| | Thickness of Desiccant | Amount of Water Entrance into Laminate Cell |
|---|---|---|
| Embodiment 26A | 0.5 mm | 5 ppm |
| Embodiment 26B | 1 mm | 6 ppm |
| Embodiment 26C | 5 mm | 4 ppm |
| Embodiment 26D | 10 mm | 2 ppm |
| Comparative Example 6 | 0.1 mm | 50 ppm (NG) |
| Comparative Example 7 | 15 mm | 1 ppm |

Further, under the environment of the temperature 25° C., the thin type laminate cells 152 of the Embodiments 26A to 26D and the thin type laminate cells of Comparative Examples 6 and 7 were repeatedly subjected to discharge tests for five seconds with a rest of one minute for ten cycles with 18A (10C(18A)), and surface temperatures of the respective laminate sheaths were measured, obtaining results shown in Table 4.

TABLE 4

|  | Thickness of Desiccant | Temperature (Radiating Performance) |
| --- | --- | --- |
| Embodiment 26A | 0.5 mm | 26° C. |
| Embodiment 26B | 1 mm | 25° C. |
| Embodiment 26C | 5 mm | 27° C. |
| Embodiment 26D | 10 mm | 30° C. |
| Comparative Example 6 | 0.1 mm | 25° C. |
| Comparative Example 7 | 15 mm | 45° C. (NG) |

As will be understood from Tables 3 and 4, the thin type laminate cell of Comparative Example 7 has an excellent waterproofing property but has an extremely deteriorated heat dissipating property, and the thin type laminate cell of Comparative Example 6 has an excellent heat dissipating property but has little or no waterproofing property. On the contrary, it is proved that the thin type laminate cells 152 of the Embodiments 26A to 26D, i.e., the thin type laminate cells 152 each having the desiccant 159 with the thickness ranging between 0.5 mm and 10 mm (equal to or greater than 0.5 mm and equal to or smaller than 10 mm), have excellent results in any of the waterproofing property and the heat radiating property.

Subsequently, water entrance tests were conducted using the thin type laminate cells 162, for the battery of the 27th Embodiment, which were directly coated with the desiccants 169B made of $SiO_2$ and each of the desiccants was entirely coated with the waterproofing material 169A made of urethane series resin.

In particular, in connection with the thin type laminate cell 162 of the battery of the 27th Embodiment, the thin type laminated cell (the Embodiment 27A) which was provided with the desiccant 169B with a thickness of 0.2 mm and the waterproofing material 169A with a thickness of 0.2 mm, the thin type laminate cell (the Embodiment 27B) which was provided with the desiccant 169B with a thickness of 1 mm and the waterproofing material 169A with a thickness of 1 mm, the thin type laminate cell (the Embodiment 27C) which was provided with the desiccant 169B with a thickness of 2 mm and the waterproofing material 169A with a thickness of 2 mm and the thin type laminate cell (the Embodiment 27D) which was provided with the desiccant 169B with a thickness of 5 mm and the waterproofing material 169A with a thickness of 5 mm were prepared, and these laminate cells were stored for three months under the environment of the temperature 25° C. and the humidity of 50%.

In contrast, the thin type laminate cell (thin type laminate cell, provided with the desiccant 169B with a thickness of 0.1 mm and the waterproofing material 169A with a thickness of 0.1 mm, corresponding to the thin type laminate cell 162 of the battery of the 27th Embodiment) of Comparative Example 8 and the thin type laminate cell (thin type laminate cell, provided with the desiccant 169B with a thickness of 7 mm and the waterproofing material 169A with a thickness of 7 mm, corresponding to the thin type laminate cell 162 of the battery of the 27th Embodiment) of Comparative Example 7 were prepared, and these laminate cells were stored, together with the thin type laminate cells 162 of the batteries of the above-described Embodiments 27A to 27D, for three months under the environment of the temperature 25° C. and the humidity of 50%.

After an elapse of three months, the amounts of entrance of water into respective laminated cells were measured in the Karl Fischer method, obtaining results shown in Table 5.

TABLE 5

|  | Thickness of Desiccant | Thickness of Waterproofing Material | Amount of Water Entrance into Laminate Cell |
| --- | --- | --- | --- |
| Embodiment 27A | 0.2 mm | 0.2 mm | 8 ppm |
| Embodiment 27B | 1 mm | 1 mm | 7 ppm |
| Embodiment 27C | 2 mm | 2 mm | 6 ppm |
| Embodiment 27D | 5 mm | 5 mm | 4 ppm |
| Comparative Example 8 | 0.1 mm | 0.1 mm | 45 ppm (NG) |
| Comparative Example 9 | 7 mm | 7 mm | 3 ppm |

Further, under the environment of the temperature 25° C., the thin type laminate cells 162 of the Embodiments 27A to 27D and the thin type laminate cells of Comparative Examples 8 and 9 were repeatedly subjected to discharge tests for five seconds with a rest of one minute for ten cycles with 18A (10C (18A)), and surface temperatures of the respective laminate sheaths were measured, obtaining results shown in Table 6.

TABLE 6

|  | Thickness of Desiccant | Thickness of Waterproofing Material | Temperature (Radiating Performance) |
| --- | --- | --- | --- |
| Embodiment 27A | 0.2 mm | 0.2 mm | 26° C. |
| Embodiment 27B | 1 mm | 1 mm | 25° C. |
| Embodiment 27C | 2 mm | 2 mm | 28° C. |
| Embodiment 27D | 5 mm | 5 mm | 29° C. |
| Comparative Example 8 | 0.1 mm | 0.1 mm | 25° C. |
| Comparative Example 9 | 7 mm | 7 mm | 44° C. (NG) |

As will be understood from Tables 5 and 6, the thin type laminate cell of Comparative Example 9 has an excellent waterproofing property but has an extremely deteriorated heat dissipating property, and the thin type laminate cell of Comparative Example 8 has an excellent heat dissipating property but has little or no waterproofing property. On the contrary, it is proved that the thin type laminate cells 162 of the Embodiments 27A to 27D, i.e., the thin type laminate cells 162 each having the desiccant 169B with the thickness ranging between 0.2 mm and 5 mm (equal to or greater than 0.2 mm and equal to or smaller than 5 mm) and the waterproofing material 169A with the thickness ranging between 0.2 mm and 5 mm (equal to or greater than 0.2 mm and equal to or smaller than 5 mm), have excellent results in any of the waterproofing property and the heat dissipating property.

(28th Embodiment)

Next, a 28th Embodiment of the present invention is described in detail with reference to FIG. 33. Also, a fundamental structure of a battery of the presently filed embodiment can be applied to the respective batteries of the first to 27th Embodiments.

Figure 33:
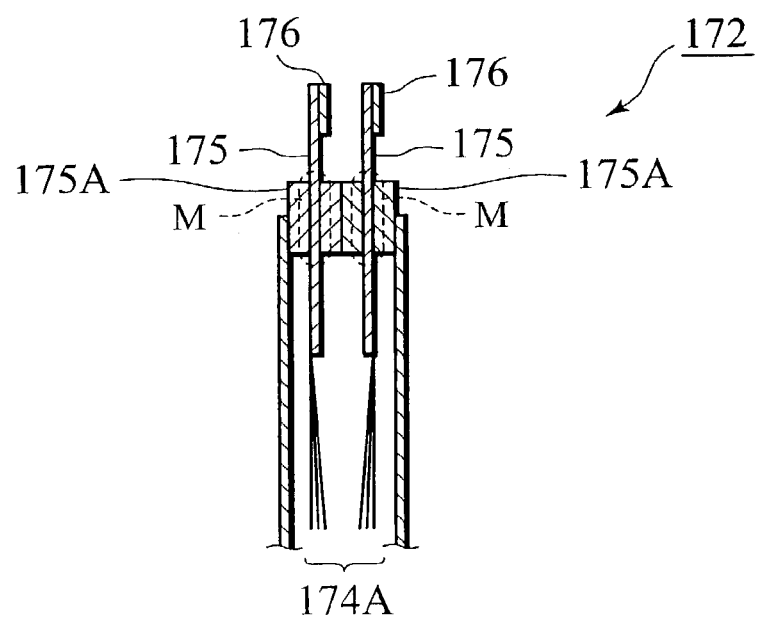
FIG. 33 is a schematic cross sectional view, taken by the x-z plane, of a thin type laminate cell in a battery of a 28th embodiment according to the present invention.

As shown in FIG. 33, a thin type laminate cell 172 of a battery of the presently filed embodiment has a structure wherein a plurality of sheets of precedingly adhered tabs 175, preliminarily mounted to a mount member 175A adapted for the laminate cell 172, are used as tabs which are connected to current collectors 174A. And, the precedingly adhered tabs 175 each formed with the plural sheets are electrically connected to bus bars 176, respectively.

Since the battery of the presently filed embodiment employs the thin type laminate cell 172 with the precedingly adhered tabs 175 each formed with the plural sheets, the respective precedingly adhered tabs 175 provide improved sealing properties at boundary regions M where the precedingly adhered tabs 175 enter an interior of the laminate cell 172. Further, to the extent that the tabs 175 become thin, there is an increase in a contact area with air with a resultant improvement in the heat dissipating property, and occurrence of stresses when encountered with bending loads can be avoided. Furthermore, since the bus bars 176 are connected to the precedingly adhered tabs 175 of plural sheets, respectively, the heat dissipating property is further improved.

The batteries of the various embodiments set forth above can be formed in modular configurations. Specifically, the modular configuration can be achieved in a pattern where the unit cells are mutually connected in parallel, a pattern where the unit cells are mutually connected in series, a pattern where the unit cells, connected in series, are mutually connected in parallel.

Figure 34:
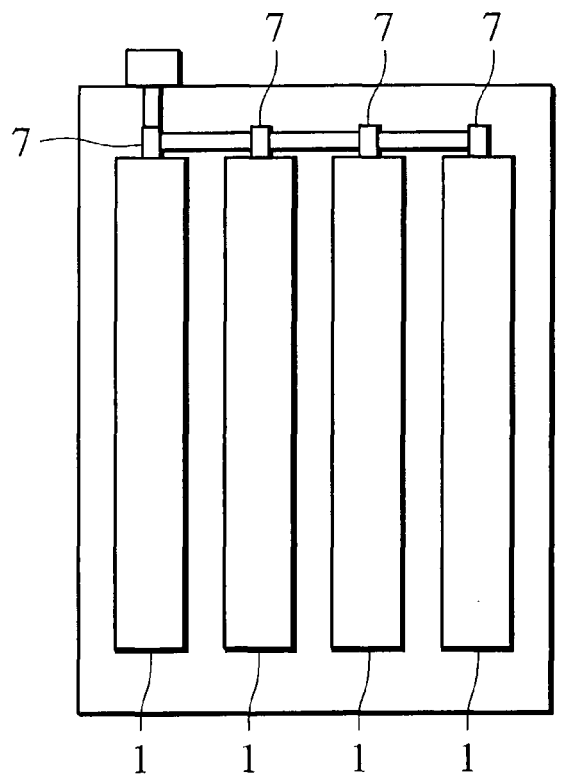
FIG. 34 is a view illustrating the batteries of the present invention mutually connected in series in a modular condition.

FIG. 34 shows a modular structure wherein the batteries 1 of the 1st Embodiment are mutually connected in series.

Thus, in a case where the batteries are formed in the modular configuration in any of the above-described patterns, even if malfunctions occur in a portion of the unit cells and the batteries, only the relevant portion can be repairable, that is, it becomes easy to perform a maintenance.

Further, the batteries of the various embodiments set forth above are able to sufficiently enhance the vibration-resistant property, the impact-resistant property and the heat-resistant property and are extremely effective to be used as the batteries of the automobile such that the use of such batteries as an on-vehicle drive source contributes to an improved fuel consumption of the automobile and a clean environment.

Figure 35:
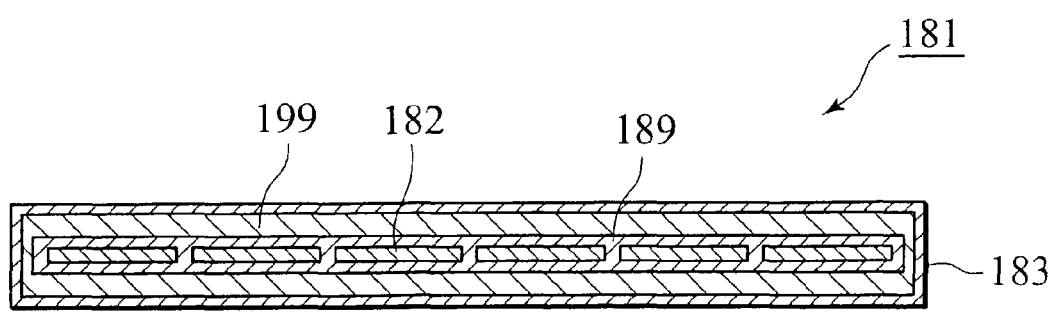
FIG. 35 is a cross sectional view, taken by the x-y plane, of a modified form of a battery according to the present invention.

Furthermore, while the 18th to 27th Embodiments have been described with respect to the structures that employ the desiccant, the hygroscopic material, the waterproofing material and the potting material, the present invention is not limited to such structures and may take another alternative structure, as shown in FIG. 35, wherein laminates of a plurality of thin type laminate cells 182 are directly coated with hygroscopic material 189 over their entire surfaces and, thereafter, potting material 199 is filled in an internal space of a case 183 encompassing these thin type laminate cells 182.

The entire contents of Patent Applications No. TOKUGAN 2002-057945 with a filing date of Mar. 4, 2002 in Japan, No. TOKUGAN 2002-190473 with a filing date of Jun. 28, 2002 in Japan and No. TOKUGAN 2002-267658 with a filing date of Sep. 13, 2002 in Japan are hereby incorporated by reference, respectively.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A battery comprising:
    a plurality of unit cells each having a tab, each of the plurality of unit cells being individually accommodated with a laminate outer sheath thereof to constitute a thin laminate cell;
    a bus bar connecting the tab of one of the plurality of unit cells and the tab of another one of the plurality of unit cells; and
    a plurality of welding points each of which is disposed around a center of an area of the tab having a rectangular shaped contour, in which the bus bar and the tab are overlapped, wherein a portion of said plurality of welding points define line segments radiately extending from said center toward apexes of the rectangular shaped contour, such that the bus bar and the tab are connected to one another at said plurality of welding points.

2. The battery according to claim 1, wherein a portion of said plurality of welding points further define a line segment extending toward a central position of at least one of the plurality of sides of the rectangular shaped contour.

3. The battery according to claim 1, wherein a portion of said plurality of welding points further define line segments extending toward central positions of a plurality of sides of the rectangular shaped contour, respectively.

4. The battery according to claim 1, wherein the plurality of unit cells are mutually connected in a parallel connection, a series connection, or a combination of the parallel connection and the series connection.

5. The battery according to claim 1, wherein the thin type laminate cell includes a current collector body to be electrically connected to the tab, and the tab and the current collector body are welded together at least one point of an area in which the tab and the current collector body is overlapped.

6. The battery according to claim 5, wherein the tab and the current collector body are welded to one another with a welding area equal to or greater than 1 mm$^2$ in the area, in which the tab and the current collector body are overlapped, and with a welding portion located inward from an edge portion of the area, in which the tab and the current collector body are overlapped, by at least a value equal to or greater than 0.5 mm.

7. The battery according to claim 1, further comprising a case accommodating the thin type laminate cell;
    wherein at least one of desiccant, hygroscopic material and waterproofing material is disposed in the case.

8. The battery according to claim 7, wherein the case has an inner surface coated with at least one of the desiccant, the hygroscopic material and the waterproofing material.

9. The battery according to claim 7, wherein at least one of the desiccant, the hygroscopic material and the waterproofing material is disposed in a portion where a gap is available.

10. The battery according to claim 9, wherein the waterproofing material and at least one of the desiccant and the hygroscopic material are laminated in a sequence in the portion where the gap is available.

11. The battery according to claim 9, wherein at least one of the desiccant and the hygroscopic material and the waterproofing material are laminated in a sequence in the portion where the gap is available.

12. The battery according to claim 7, wherein potting material is filled in a space of the case.

13. The battery according to claim 12, wherein the potting material is mixed with desiccant or hygroscopic material.

14. The battery according to claim 1, wherein desiccant or hygroscopic material is disposed on a laminate sheath of the thin type laminate cell.

15. The battery according to claim 14, wherein the desiccant or the hygroscopic material is directly placed on the laminate sheath of the thin type laminate cell.

16. The battery according to claim 14, wherein the desiccant or the hygroscopic material have a thickness no smaller than 0.5 mm nor greater than 10 mm.

17. The battery according to claim 14, wherein the thin type laminate cell is entirely covered with a waterproofing coating.

18. The battery according to claim 17, wherein the desiccant or the hygroscopic material have a thickness no smaller than 0.2 mm nor greater than 5 mm, and the waterproofing coating has a thickness no smaller than 0.2 mm nor greater than 5.

19. The battery according to claim 1, wherein the tab of the thin type laminate cell includes a plurality of precedingly adhered tabs.

20. The battery according to claim 19, wherein the bus bar is connected to associated one of the plurality of precedingly adhered tabs.

21. The battery according to claim 1, wherein the bus bar and the tab are welded by an ultrasonic welding.

22. The battery according to claim 1, wherein the battery is mutually connected in a parallel connection, a series connection, or a combination of the parallel connection and the series connection to form a modular structure.

23. The battery according to claim 1, wherein the battery is connected to a load of an electric vehicle.

24. A battery comprising:
   a plurality of unit cells each having a tab, each of the plurality of unit cells being individually accommodated with a laminate outer sheath thereof to constitute a thin laminate cell;
   a bus bar connecting the tab of one of the plurality of unit cells and the tab of another one of the plurality of unit cells; and
   welding means for welding the bus bar and the tab at a plurality of welding points each of which is disposed around a center of an area of the tab having a rectangular shaped contour, in which the bus bar and the tab are overlapped, wherein a portion of said plurality of welding points define line segments radiately extending from said center toward apexes of the rectangular shaped contour, such that the bus bar and the tab are connected to one another at said plurality of welding points.

* * * * *